(12) United States Patent
Fuller et al.

(10) Patent No.: US 9,328,832 B2
(45) Date of Patent: May 3, 2016

(54) WHEATSTONE BRIDGE CHECK VALVE ARRANGEMENT

(71) Applicant: Zhejiang DunAn Hetian Metal Co., Ltd., Zhuji, Zhejiang (CN)

(72) Inventors: Edward Nelson Fuller, Manchester, MI (US); Parthiban Arunasalam, Austin, TX (US)

(73) Assignee: Zhejiang DunAn Hetian Metal Co., LTD., Zhuji (CN)

( * ) Notice: Subject to any disclaimer, the term of this patent is extended or adjusted under 35 U.S.C. 154(b) by 367 days.

(21) Appl. No.: 14/136,985

(22) Filed: Dec. 20, 2013

(65) Prior Publication Data

US 2014/0174575 A1 Jun. 26, 2014

Related U.S. Application Data

(60) Provisional application No. 61/745,764, filed on Dec. 25, 2012.

(51) Int. Cl.
*F16K 17/26* (2006.01)
*F16K 15/04* (2006.01)
*F16K 11/07* (2006.01)

(52) U.S. Cl.
CPC ............. *F16K 15/04* (2013.01); *F16K 11/0716* (2013.01); *Y10T 137/86831* (2015.04)

(58) Field of Classification Search
CPC .................... F15B 11/006; F15B 2211/30575; F16K 11/02; F16K 11/0716; F16K 15/04; Y10T 137/86831; Y10T 137/86775; Y10T 137/8671; Y10T 137/86839
See application file for complete search history.

(56) References Cited

U.S. PATENT DOCUMENTS

| 6,467,264 | B1 * | 10/2002 | Stephenson | F15B 11/006 60/368 |
| 6,684,651 | B1 * | 2/2004 | Yoshizawa | F16K 11/0655 137/625.43 |
| 2008/0034957 | A1 * | 2/2008 | Stephenson | F15B 11/006 91/454 |
| 2008/0110165 | A1 * | 5/2008 | Hamkins | E02F 9/2217 60/414 |
| 2008/0110166 | A1 * | 5/2008 | Stephenson | E02F 9/2217 60/414 |

FOREIGN PATENT DOCUMENTS

| DE | EP 0057355 A2 * | 8/1982 | ................ B66B 1/24 |
| DE | EP 0219052 A2 * | 4/1987 | ............ F15B 11/003 |
| DE | EP 1635070 A1 * | 3/2006 | ............ F15B 11/006 |

OTHER PUBLICATIONS

Machine Translation of EP1635070 from EPO website (retrieved on Feb. 18, 2016).*

* cited by examiner

*Primary Examiner* — Jessica Cahill
(74) *Attorney, Agent, or Firm* — MacMillan, Sobanski & Todd, LLC

(57) ABSTRACT

A device is disclosed that may include a spool valve having a first connector and a second connector and a spool movable for controlling flow between the first connector and the second connector, regardless of direction of flow through the spool valve. A pilot valve having an inlet and an outlet develops a command pressure. A feedback circuit having an inlet and an outlet develops a feedback pressure. The spool valve may be responsive to the command pressure and the feedback pressure. A fluid rectifier circuit is provided to connect the higher pressure of the first connector and second connector to the pilot valve inlet and feedback circuit inlet, and connect the other of the first connector and second connector to the pilot valve outlet and feedback circuit outlet.

18 Claims, 17 Drawing Sheets

Feedback Pressure versus Travel
during Reverse Flow (Calculated
Examle)

| travel | A1 | A2 | A1^2 | A2^2 | Feed back Pressure = A2^2(A1^2+A2^2) |
|---|---|---|---|---|---|
| 0 | 0 | 0.786 | 0 | 0.618 | 1 |
| 0.1 | 0.041 | 0.745 | 0.002 | 0.555 | 0.996980453 |
| 0.2 | 0.118 | 0.674 | 0.014 | 0.454 | 0.970260572 |
| 0.3 | 0.198 | 0.587 | 0.039 | 0.345 | 0.897660516 |
| 0.4 | 0.293 | 0.492 | 0.086 | 0.242 | 0.737668139 |
| 0.5 | 0.393 | 0.393 | 0.154 | 0.154 | 0.5 |
| 0.6 | 0.492 | 0.293 | 0.242 | 0.086 | 0.262331861 |
| 0.7 | 0.587 | 0.198 | 0.345 | 0.039 | 0.102339484 |
| 0.8 | 0.674 | 0.118 | 0.454 | 0.014 | 0.029739428 |
| 0.9 | 0.745 | 0.041 | 0.555 | 0.002 | 0.003019547 |
| 1 | 0.786 | 0 | 0.618 | 0 | 0 |

FIG. 5

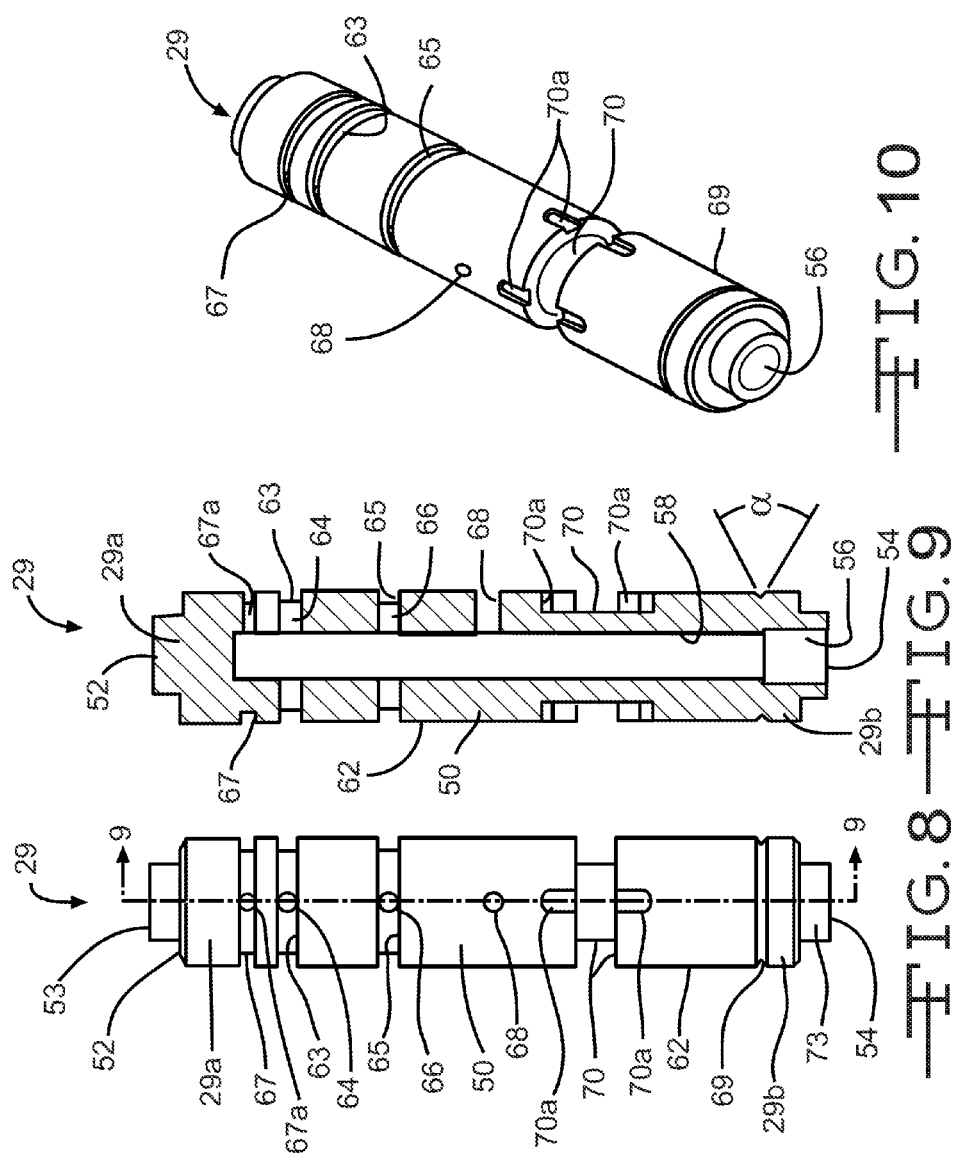

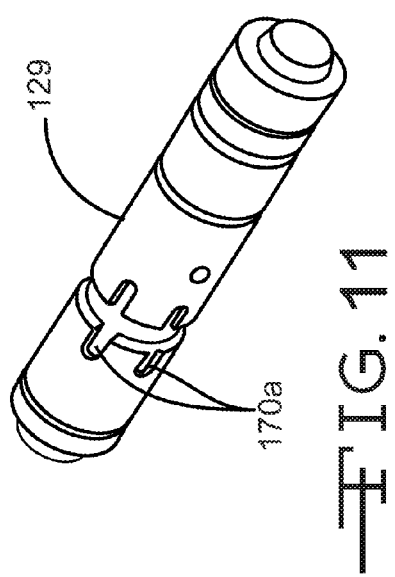
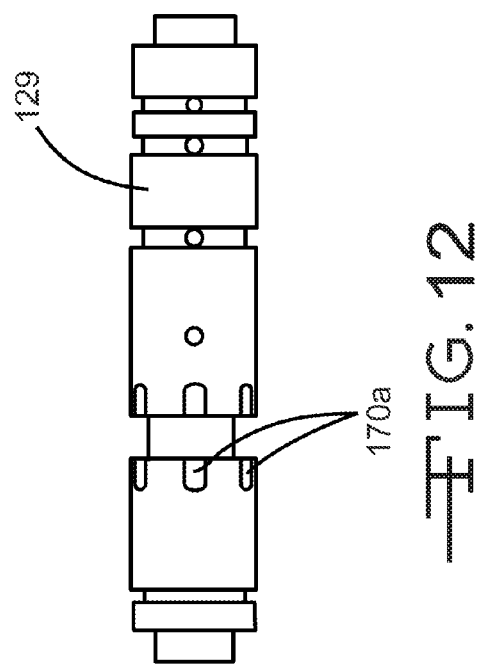

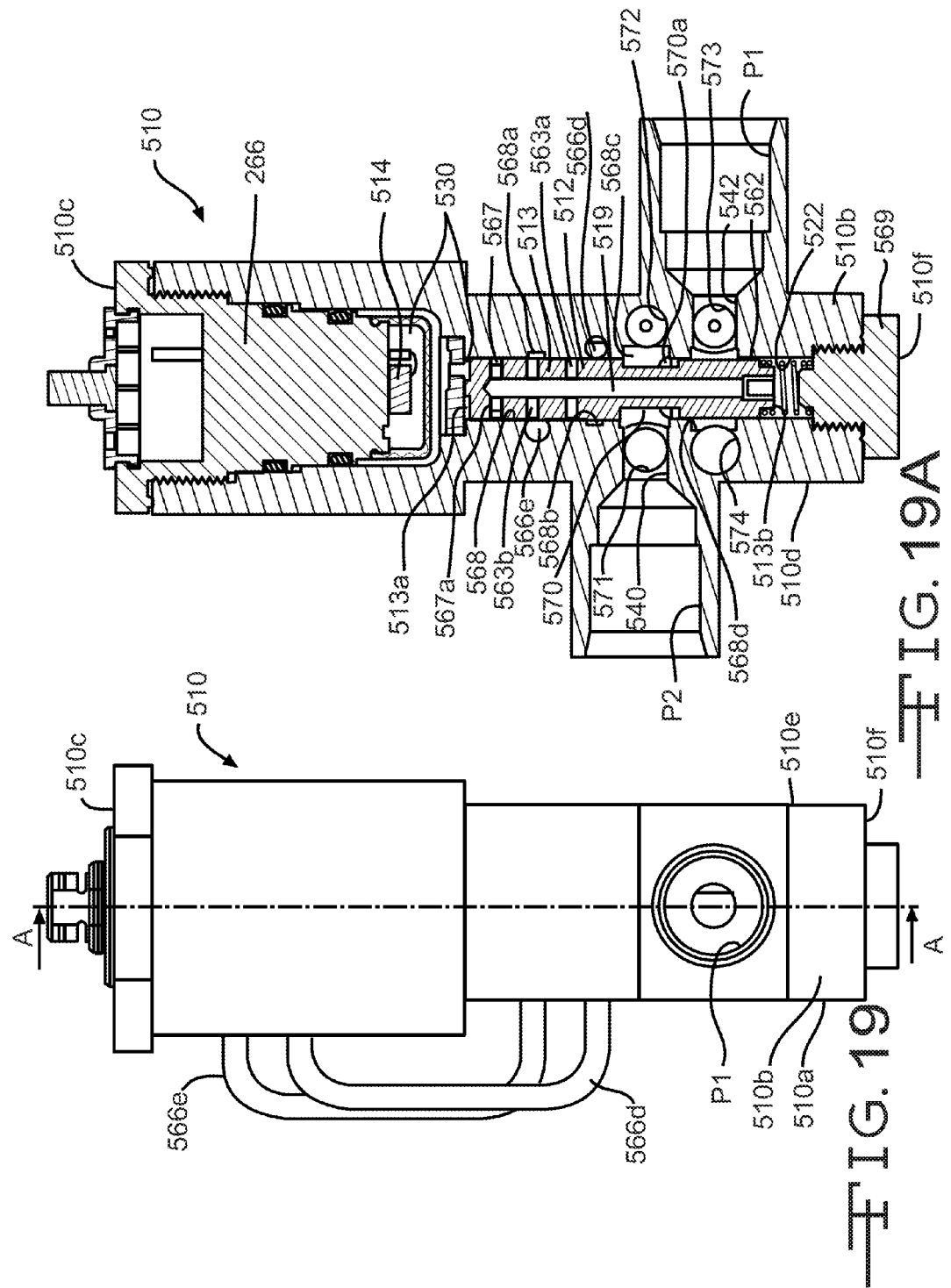

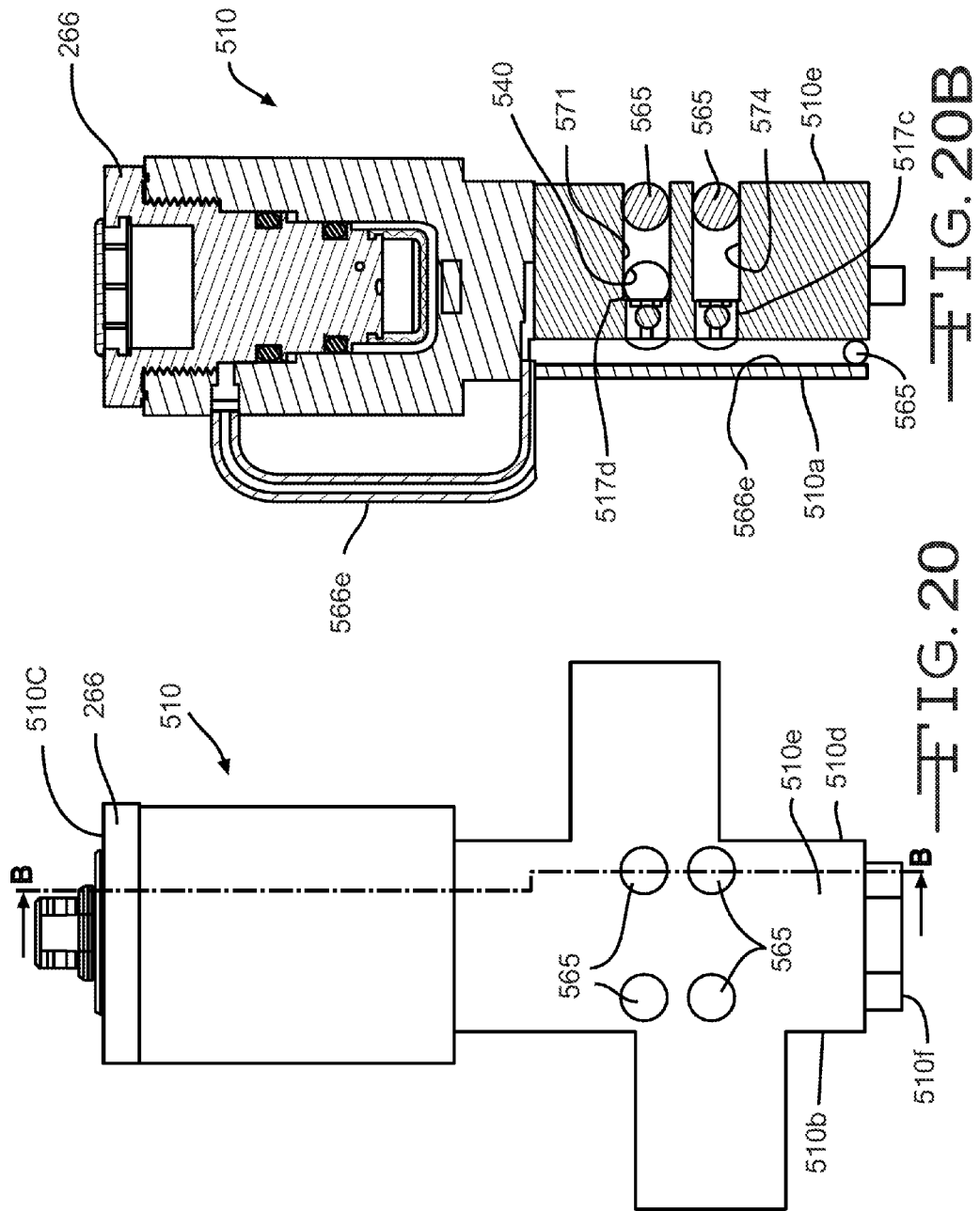

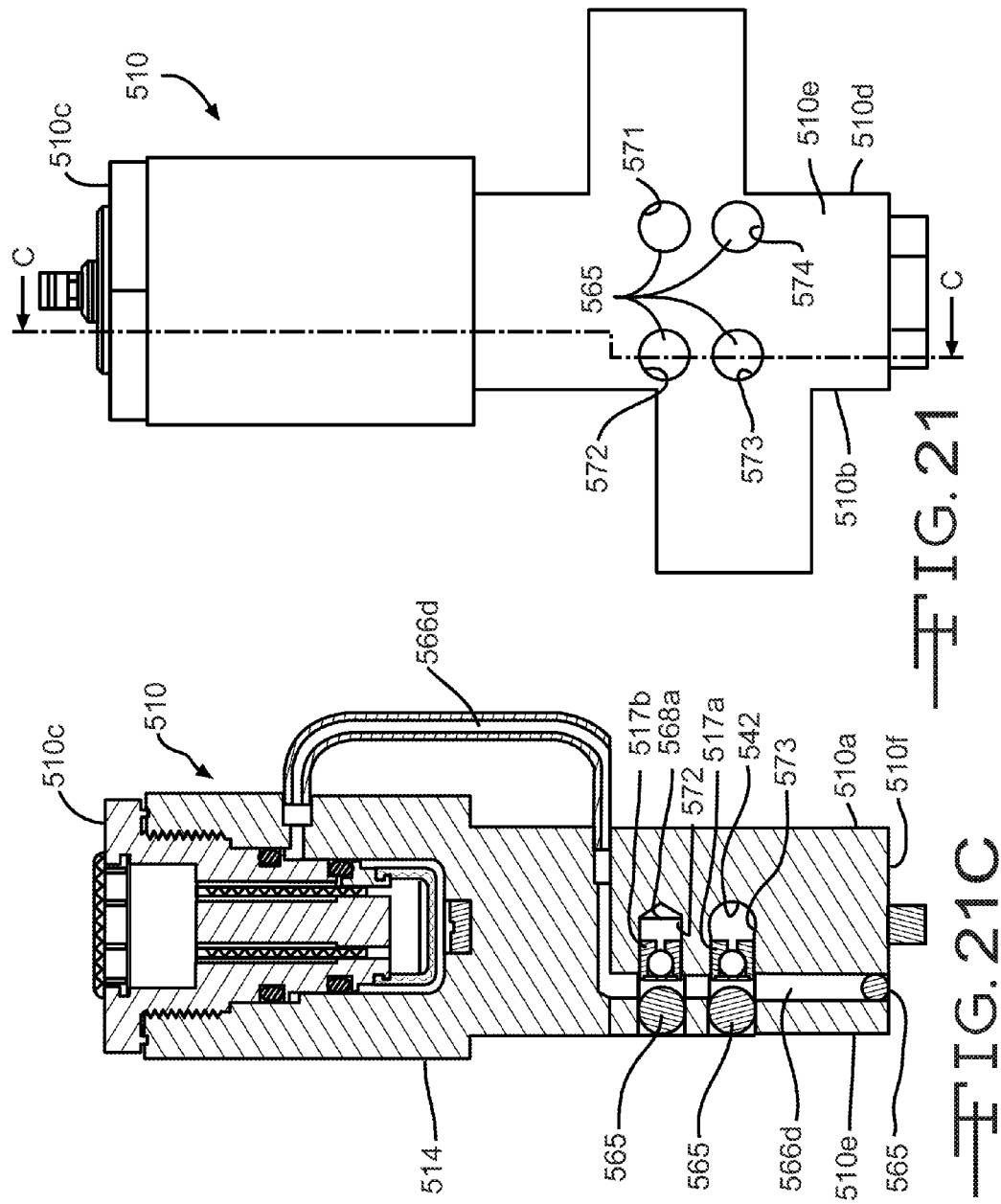

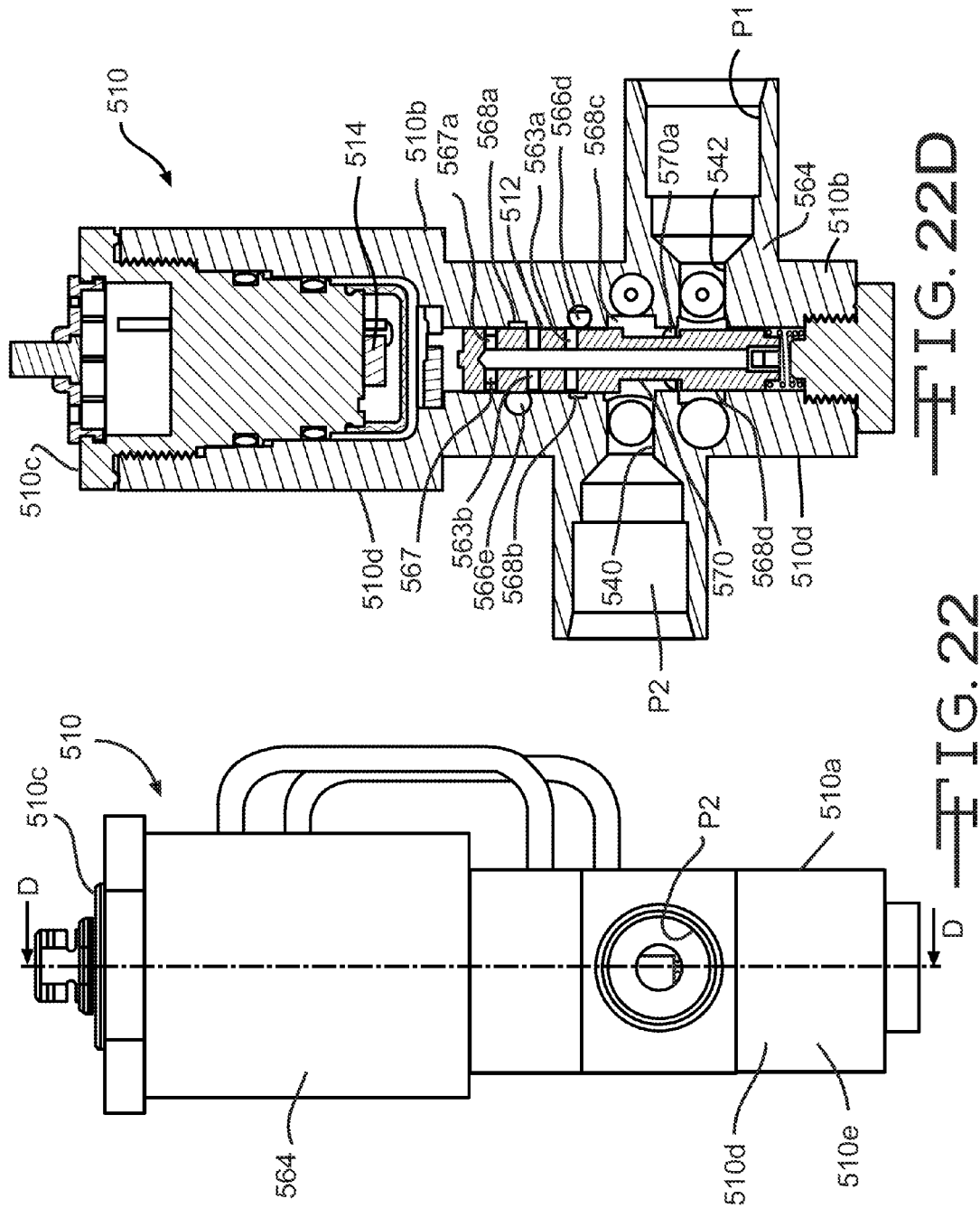

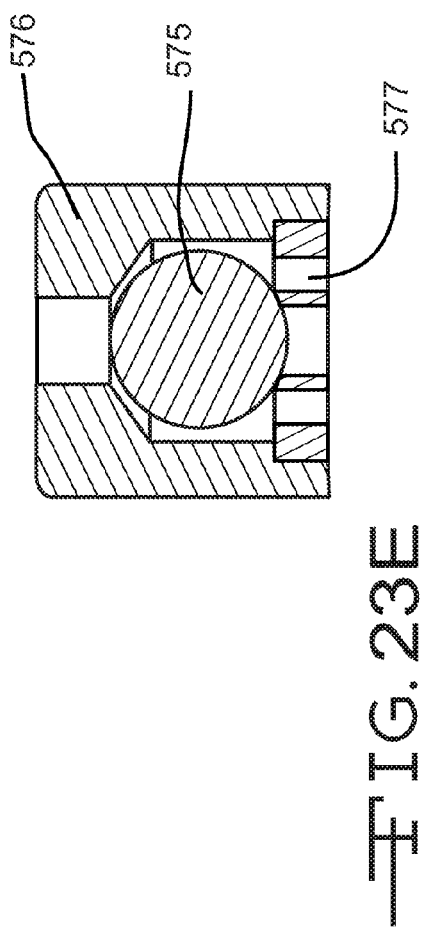
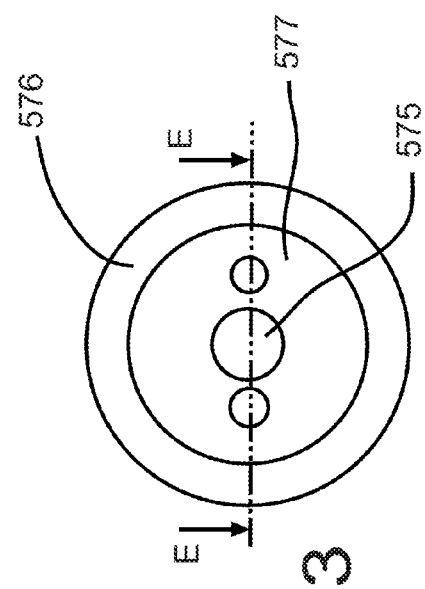
FIG. 23E
FIG. 23

WHEATSTONE BRIDGE CHECK VALVE ARRANGEMENT

CROSS-REFERENCE TO RELATED APPLICATIONS

This application claims priority to provisional U.S. patent application No. 61/745,764, filed Dec. 25, 2012, the disclosures of which are incorporated by reference herein.

BACKGROUND OF THE INVENTION

This invention relates in general to valves for controlling fluid flow and more particularly, to a fluid flow control assembly for controlling fluid flow in two directions of flow through a pilot-operated main spool valve, and having a check valve arrangement forming a fluid rectifier circuit to provide unidirectional fluid flow through a pilot valve operating the main spool valve.

Valves are widely used for controlling the flow of a fluid from a source of pressurized fluid to a load device or from a load device to a low-pressure reservoir. Frequently, a pump, or other device, is provided as the source of pressured fluid. The flow of the fluid is selectively controlled by a valve to control the operation of the load device.

One type of valve is a microvalve. A microvalve system is a MicroElectroMechanical System (MEMS) relating in general to semiconductor electromechanical devices.

MEMS are a class of systems that are physically small, having some features or clearances with sizes in the micrometer range or smaller (i.e., smaller than about 10 microns). These systems have both electrical and mechanical components. The term "micro machining" is commonly understood to mean the production of three-dimensional structures and moving parts of MEMS devices. MEMS fabricators originally used modified integrated circuit (e.g., computer chip) fabrication techniques (such as chemical etching) and materials (such as silicon semiconductor material) to micro machine these very small mechanical devices. Today there are many more micro machining techniques and materials available. The term "MEMS device" as may be used in this application means a device that includes a micro machined component having some features or clearances with sizes in the micrometer range, or smaller (i.e., smaller than about 10 microns). It should be noted that if components other than the micro machined component are included in the MEMS device, these other components may be micro machined components or standard sized (i.e., larger) components. Similarly, the term "microvalve" as may be used in this application means a valve having features or clearances with sizes in the micrometer range, or smaller (i.e., smaller than about 10 microns) and thus by definition is at least partially formed by micro machining. The term "microvalve device" as may be used herein means a device that includes a microvalve, and that may include other components. It should be noted that if components other than a microvalve are included in the microvalve device, these other components may be micro machined components or standard sized (i.e., larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

One specific type of microvalve system is the pilot-operated microvalve. Typically, such a microvalve device includes a micro spool valve that is pilot operated by a microvalve of the type as described above. For example, U.S. Pat. Nos. 6,494,804; 6,540,203; 6,637,722; 6,694,998; 6,755,761; 6,845,962; and 6,994,115, the disclosures of which are herein incorporated by reference, disclose pilot-operated microvalves and microvalves acting as pilot valves.

Microvalve devices have application in many fields for controlling the flow of fluids in systems such as hydraulic, pneumatic, and refrigerant systems, including the Heating, Ventilation, and Air Conditioning (HVAC) field. HVAC systems may include, without limitation, such systems as refrigeration systems, air conditioning systems, air handling systems, chilled water systems, etc. Many HVAC systems, including air conditioning and refrigeration systems operate by circulating a refrigerant fluid between a first heat exchanger (an evaporator), where the refrigerant fluid gains heat energy, and a second heat exchanger (a condenser), where heat energy in the refrigerant fluid is rejected from the HVAC system. One type of HVAC system is the heat pump system, which provides the ability to reverse flow of refrigerant through portions of the HVAC system. This allows the heat pump system to act as an air conditioning system in the summer, cooling air that flows through a first heat exchanger by absorbing the heat from the air into a refrigerant pumped through the first heat exchanger. The refrigerant then flows to a second heat exchanger, where the heat gained by the refrigerant in the first heat exchanger is rejected. However, during the winter, the flow of refrigerant between the first and second heat exchangers is reversed. Heat is absorbed into the refrigerant in the second heat exchanger, and the refrigerant flows to the first heat exchanger, where the heat is rejected from the refrigerant into the air flowing through the first heat exchanger, warming the air passing through the first heat exchanger.

SUMMARY OF THE INVENTION

This invention relates to an improved device for controlling fluid flow in a system, such as, but not limited to, a hydraulic, pneumatic, or HVAC system, and in particular to a reversible fluid flow control assembly useful in a heat pump type HVAC system.

The assembly may include a pilot valve responsive to a command signal for supplying a fluid at a command pressure to a pilot valve control port; and a pilot-operated spool valve. The pilot valve may have a pilot valve inlet port and a pilot valve outlet port, and may define a fluid passageway between the pilot valve inlet port and the pilot valve outlet port. The pilot-operated spool valve may have a body having a first connector and a second connector, each of the first connector and the second connector being adapted for fluid communication with an external circuit. A spool may be disposed for sliding movement in the body. The spool may have a first end portion and a second end portion opposite the first end portion. The first end portion of the spool may be in fluid communication with the pilot valve control port such that the spool is urged to move in a first direction by the fluid at the command pressure. The spool may be movable to control a fluid flow between the first connector and the second connector through a main flow path through the body, responsive to the command pressure, when the fluid flow is a forward flow from the first connector to the second connector and when the fluid flow is a reverse flow from the second connector to the first connector. The spool valve may use negative feedback in the form of fluid at a feedback pressure acting on the spool in a second direction, opposite the first direction, to position the spool in conjunction with the fluid at the command pressure. A fluid rectifier circuit may be provided to route fluid from the higher pressure of the first connector and the second connector to an inlet of the pilot valve, and to return fluid from the discharge of the pilot valve to the lower pressure of the first connector and the second connector.

Various aspects of this invention will become apparent to those skilled in the art from the following detailed description of the preferred embodiment, when read in light of the accompanying drawings.

BRIEF DESCRIPTION OF THE DRAWINGS

FIG. 5 is an exemplary table of calculated feedback pressure developed for various positions of the spool during reverse flow operations.

FIG. 8 is a side view of the spool illustrated in FIGS. 1-4.

FIG. 9 is a sectional view of the spool illustrated in FIG. 8, taken along the line 9-9 of FIG. 8.

FIG. 10 is a perspective view of the spool illustrated in FIGS. 8 and 9.

FIG. 11 is a view similar to FIG. 10, but showing a first alternate embodiment of a spool.

FIG. 12 is a side view of the spool of FIG. 11.

FIG. 19 is a first side view of the flow control assembly of FIG. 17.

FIG. 19A is a sectional view taken along the line A-A of FIG. 19, showing the spool valve in a closed position.

FIG. 20 is a rear view of the flow control assembly of FIG. 17.

FIG. 20B is a sectional view taken along the line B-B of FIG. 20.

FIG. 21, like FIG. 20, is a rear view of the flow control assembly of FIG. 17.

FIG. 21C is a sectional view taken along the line C-C of FIG. 21.

FIG. 22 is a second side view of the flow control assembly of FIG. 17.

FIG. 22D is a sectional view taken along the line D-D of FIG. 22, showing the spool valve in an open position.

FIG. 23 is an end view of a check valve suitable for use in the flow control assembly of FIG. 17.

FIG. 23E is a sectional view taken along the line E-E of FIG. 23.

DETAILED DESCRIPTION OF THE PREFERRED EMBODIMENT

Figure 1:
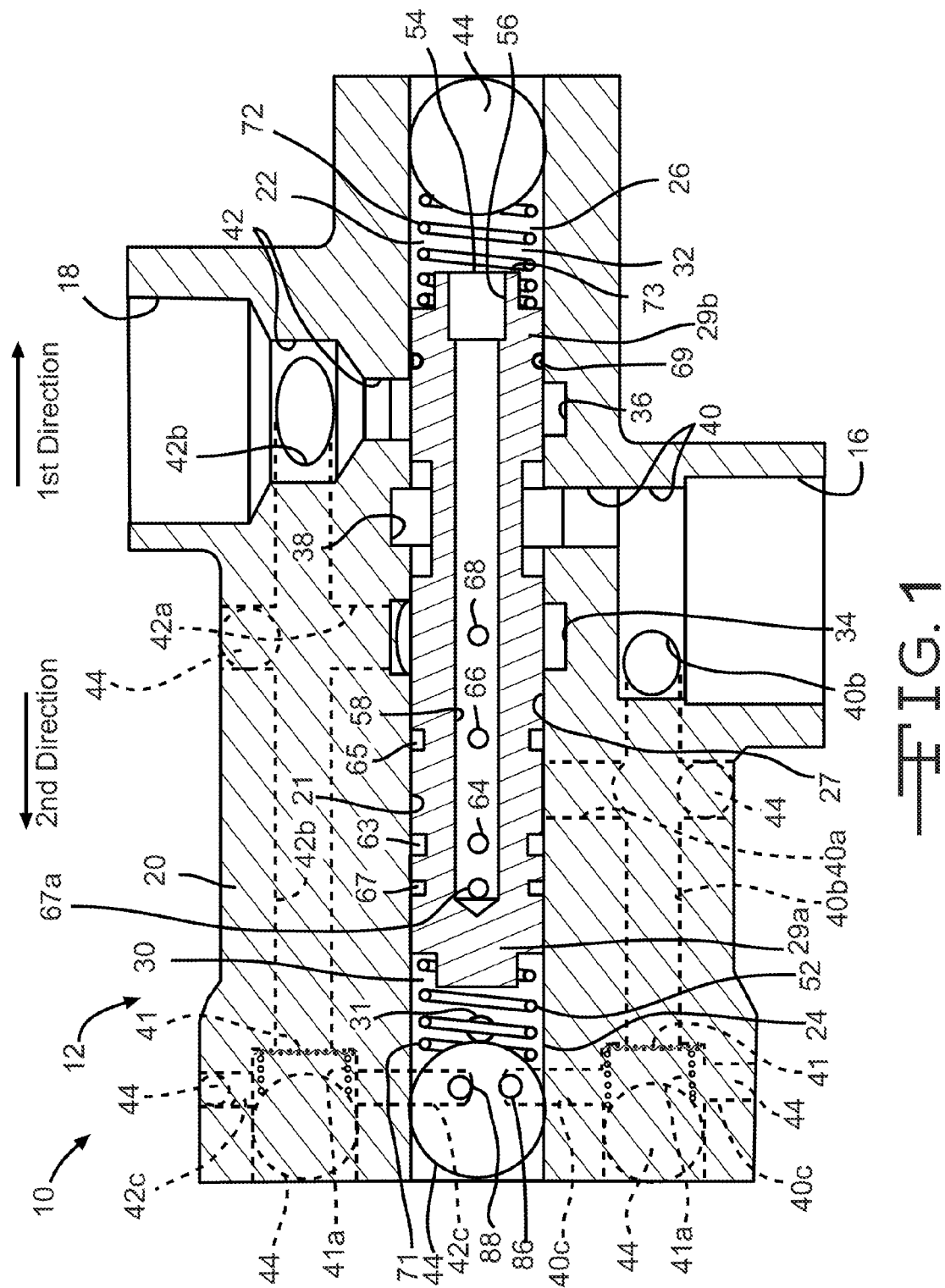
FIG. 1 is a partial cross-section and partial schematic representation of a spool valve of reversible fluid flow control device, in a normally closed position.

Preliminarily, it should be understood that in this description and in the claims, the use of the singular word "port", "aperture", "fluid conduit", "passageway", or words of similar import, should be considered to include the possibility of multiple ports (apertures, fluid conduits, passageways, etc.) with the same functionality attributed to the single port (apertures, fluid conduits, passageways, etc.) unless explicitly and definitely limited to the singular. Furthermore, the use of directional terms such as "left" and "right", "top", "bottom", "front", "rear" and other directional terms of similar import, should be interpreted in the context of the figure(s) under discussion, and should not be interpreted as limitations on orientation during use or the scope of the claims.

Furthermore, the term "Wheatstone Bridge" is not intended as a limitation upon the design of the invention or of the claims; the use of the term is intended merely to readily bring to mind a generalized diamond pattern schematic diagram shape familiar to many engineers. Charles Wheatstone popularized an arrangement of four resistors, a power supply, and a galvanometer; in a bridge circuit, he called a "Differential Resistance Measurer." This electrical circuit is typically used to measure the resistance of a resistor having an unknown electrical resistance by balancing two legs of a bridge circuit, each leg of which contains two resistors, one leg of which includes the resistor with an unknown resistance as one of the resistors, the resistance of the remaining three resistors being know. In electrical schematic diagrams, a Wheatstone bridge circuit is typically illustrated as a four sided diamond shape, with one resistor (including the unknown component) on each side of the diamond shape. The galvanometer is typically illustrated schematically in a horizontal line connecting between the pairs of resistors of each of the two legs, connected at the two horizontally opposed points of the diamond, while the power supply supplying the two legs in electrical parallel is typically illustrated as being connected between the two vertically opposed points of the diamond. As will be seen, a preferred embodiment of the check valves of the fluid rectifier circuit, the pilot valve, and the pilot-operated spool valve described below may similarly be schematically illustrated as a four-sided diamond shape, with one check valve illustrated on each side of the diamond shape. The pilot valve may be illustrated schematically in a horizontal line connecting between the pairs of check valves, connected at the two horizontally opposed points of the diamond, while the pilot-operated spool valve (which may be utilized as a source of pressurized fluid supplied to the pilot valve) may be illustrated as being connected between the two vertically opposed points of the diamond. It will be readily appreciated that there is no identity of function between the electrical test equipment utilizing a Wheatstone bridge circuit, and the fluid control device of the present invention, and no limitation on the structure or operation of the device of our invention is intended by the use herein of the convenient suggestive term "Wheatstone bridge".

Initially, we will describe a variety of fluid flow control assemblies adapted to control a flow of fluid between two connectors in either of two directions of flow through the fluid control assemblies between the two connectors. Referring now to the drawings, wherein like reference numbers and characters may represent like elements throughout all of the figures, there is illustrated in FIGS. 1 through 4 a reversible fluid flow control assembly, generally indicated at 10. The flow control assembly 10 may include a pilot-operated spool valve, indicated generally at 12, and a pilot valve device 14 (illustrated schematically in FIG. 2). The spool valve 12 and the pilot valve device 14 each may be in fluid communication with a first connector 16, by means of which the flow control assembly 10 may be connected in fluid communication with a first portion of a system (not shown) in which the flow control assembly 10 may be installed, as will be described in detail below. As will also be described in detail below, the spool valve 12 and the pilot valve device 14 each may be in fluid communication with a second connector 18, by means of which the flow control assembly 10 may be connected in fluid communication with a second portion of the system, which the flow control assembly 10 may be installed. The first connector 16 and the second connector 18 each may be any suitable structure by means of which the flow control assembly 10 may be connected for installation in the system, including without limitation, threaded connections, welded connections, brazed connections, soldered connections, press-fit connections, rolled connections, permanently deformable connections, adhesive connections, compression fitting connections, etc.

The spool valve 12 may include a body 20. Preferably, the first connector 16 and the second connector 18 are at least partially formed in the body 20, where each of the first connector 16 and the second connector 18 is shown, as an example only, as a connection port that can be brazed to standard refrigeration lines (not shown). The body 20 may be made of any material suitable for the application, such as brass, copper, aluminum, or other metal, suitable plastics, etc.

The body 20 may have an interior wall surface 21 defining a bore 22 therethrough. The bore 22 may have a first end portion, indicated generally at 24, a second end portion, indicated generally at 26, and a central portion, indicated generally at 27. The first end portion 24 of the bore 22 may be formed to accept a pressed-in ball 44 to form a leak-tight pressure boundary at the first end portion 24 of the bore 22. Similarly, the second end portion 26 of the bore 22 may accept another pressed-in ball 44 to form a leak-tight pressure boundary at the second end portion 26 of the bore 22. Suitably, the body 20 may be deformed by rolling, staking, etc., to capture the balls 44 in their respective end portions 24, 26 of the bore 22.

Figure 2:
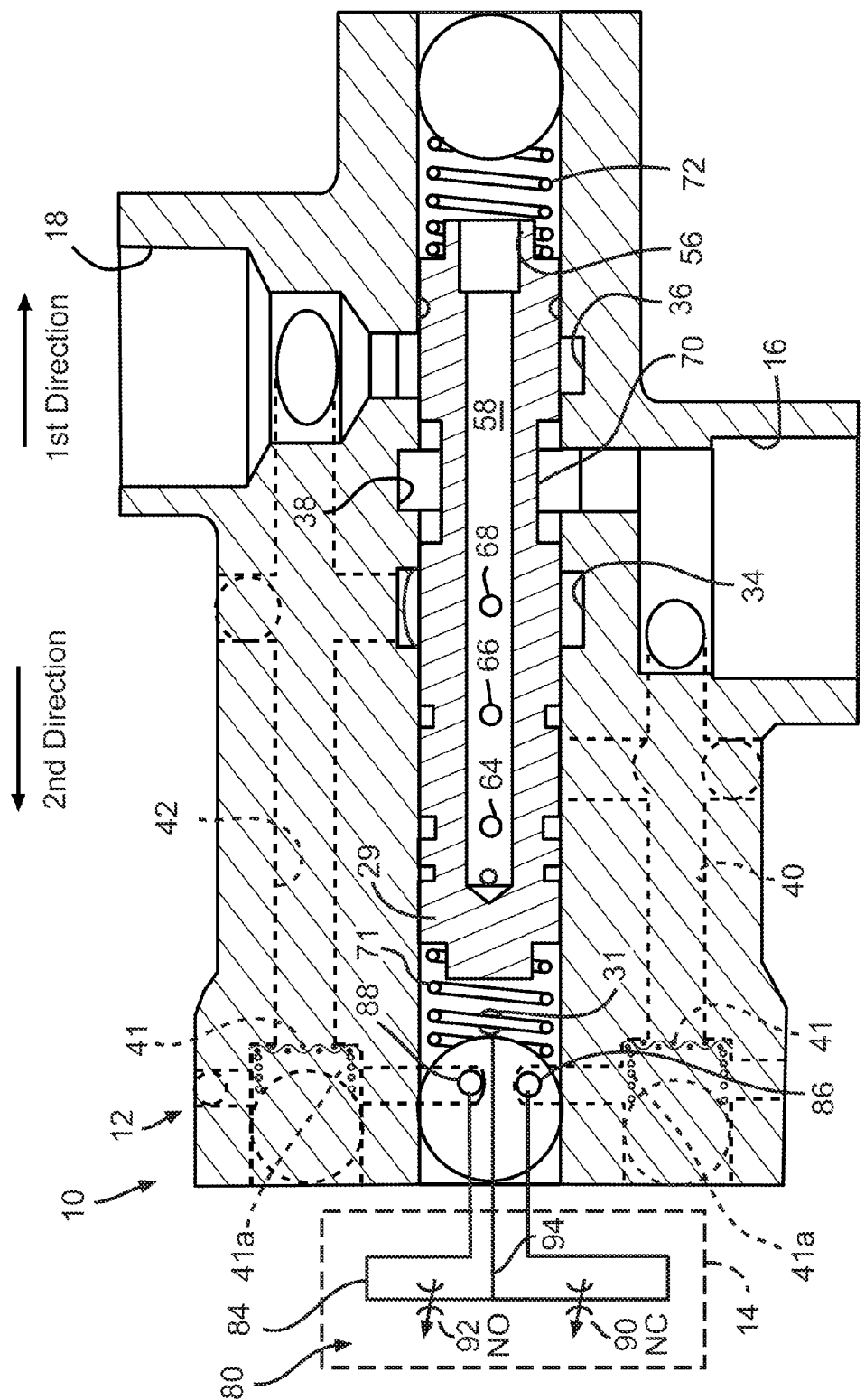
FIG. 2 is a view similar to FIG. 1, but additionally showing, in schematic form, a pilot valve for controlling the spool valve of the reversible fluid flow control device.

The spool valve 12 may further include a spool 29 disposed for sliding movement in the bore 22. The spool 29 may have a first end portion 29a and a second end portion 29b. As illustrated in FIGS. 1 and 2, the spool 29 may be oriented in the bore 22 with the first end portion 29a of the spool 29 near the first end portion 24 of the bore 22, and the second end portion 29b of the spool 29 near the second end portion 26 of the bore 22. The structure of the spool 29 will be discussed in further detail below.

The spool 29 and the pressed-in ball 44 in the first end portion 24 of the bore 22 cooperate with the body 20 to define a command chamber 30 in the first end portion 24 of the bore 22. The purpose of the command chamber 30 will be discussed below. A control port 31 is formed in the body 20 which may be in fluid communication with the command chamber 30 and, as will be discussed further below, in fluid communication with the pilot valve device 14. The spool 29 and the pressed-in ball 44 in the second end portion 26 of the bore 22 cooperate with the body 20 to define a feedback chamber 32 in the second end portion 26 of the bore 22. The purpose of the feedback chamber 32 will be discussed below.

As illustrated in FIG. 1, a plurality of cavities may be formed in the body 20 in fluid communication with the central portion 27 of the bore 22, at axially spaced locations along the bore 22. A first one of this plurality of cavities may take the form of a circumferentially-extending first body groove 34 formed in the surface 21 of the body 20 defining the bore 22 at a first axial location along the bore 22, which, compared to the locations of the rest of the plurality of cavities, may be seen to be relatively close to the first end portion 24 of the bore 22, and thus closest to the command chamber 30. A second one of this plurality of cavities may take the form of a circumferentially-extending second body groove 36 formed in the surface 21 of the body 20 defining the bore 22 at a second axial location along the bore 22 which may be closer to the second end portion 26 of the bore 22 (and thus closer to the feedback chamber 32) than the first axial location where the first groove 32 may be located. A third one of this plurality of cavities may take the form of a circumferentially-extending third body groove 38 formed in the surface 21 defining the bore 22 at a third axial location along the bore 22 which is intermediate, preferably midway between the first axial location at which the first body groove 34 may be located and the second axial location at which the second body groove 36 may be located.

Figure 3:
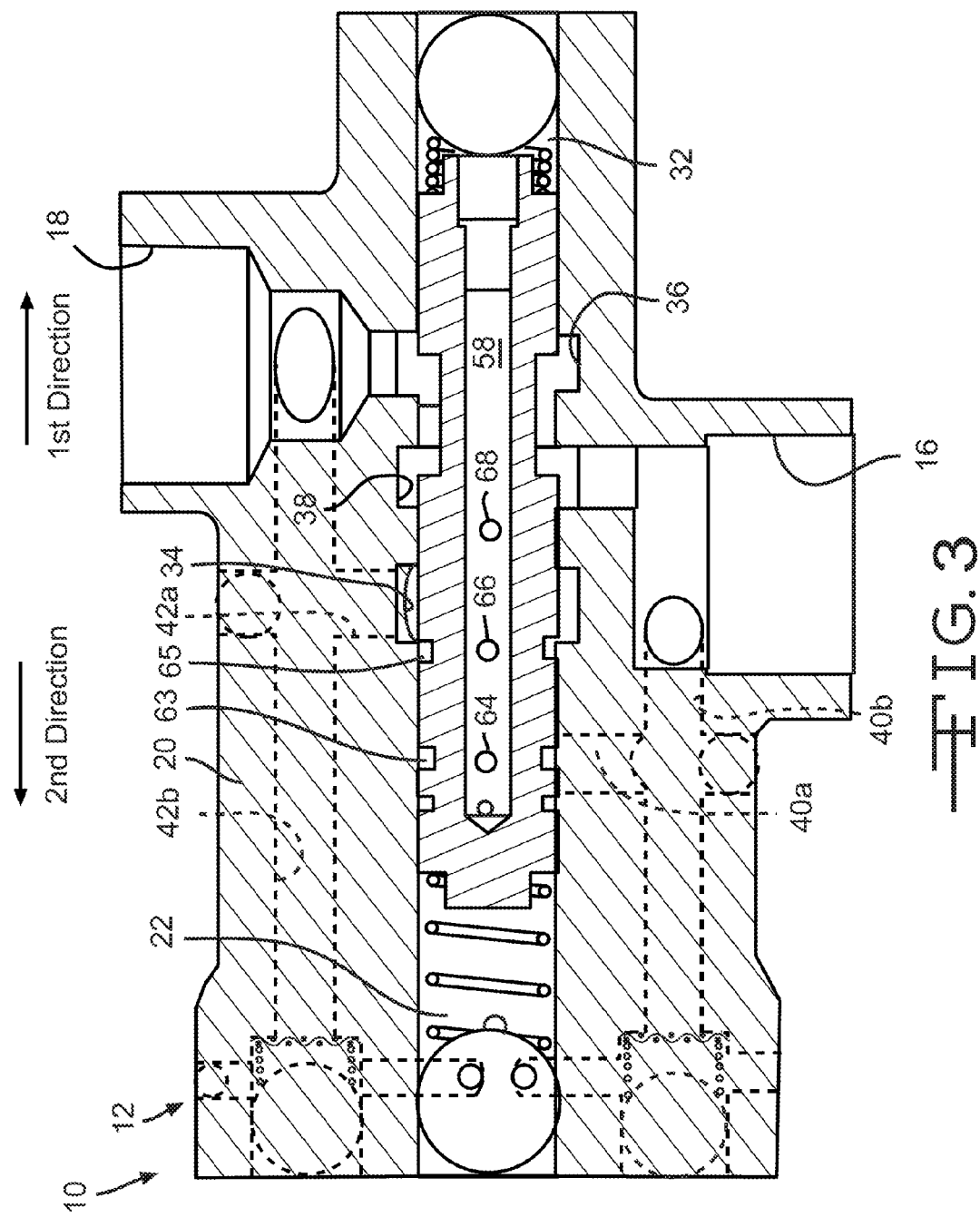
FIG. 3 is a sectional view of the spool valve of the reversible fluid flow control device, showing the spool thereof in a first, forward flow open position.
Figure 4:
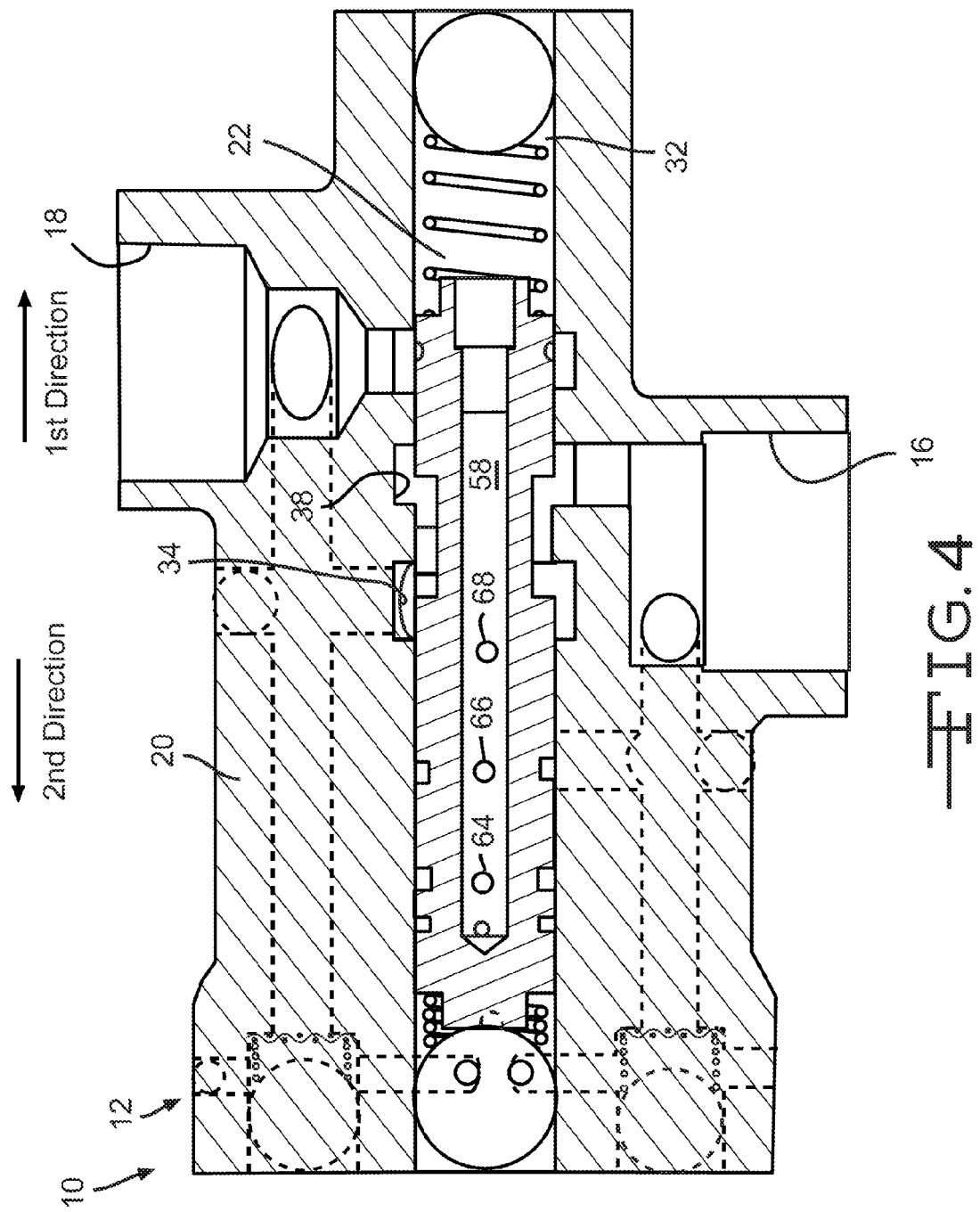
FIG. 4 is a sectional view of the spool valve of the reversible fluid flow control device, showing the spool thereof in a second, reverse flow open position.

The body 20 may define a fluid conduit 40. A first branch of the fluid conduit 40 provides fluid communication between the first connector 16 and the third body groove 38. The fluid conduit 40 may include other branches, in the form of intersecting bores 40a, 40b, and 40c. The intersecting bores 40a, 40b, and 40c may be formed, for example, by drilling through the body 20 from the surface of the body 20, and then closing the outer ends of the bores 40a, 40b, and 40c in some manner, such as by pressing in respective balls 44, which may be followed by deformation of the body 20 by rolling, staking, etc., to capture the balls 44 in their respective bores. The bore 40a is disposed to communicate with the central portion 27 of the bore 22 in which the spool 29 is disposed. In the position illustrated in FIGS. 1 and 2, which is a normally closed position, the spool 29 blocks the bore 40a, substantially preventing fluid communication between the fluid conduit 40 and any volume within the bore 22. However, as seen in FIGS. 3 and 4 and as will be described below, the spool 29 can be moved to positions in which the spool 29 does not block the bore 40a. The bore 40b communicates with the bore 40a and with the first branch of the fluid conduit 40, and thus communicates with the first connector 16 and the third body groove 38. The bore 40b may have a shoulder defined therein near the ball 44 pressed into the bore 40b. A filter 41 may be seated against the shoulder in the bore 40b, and is held in place by a respective spring 41a compressed between the filter 41 and the adjacent ball 44. The bore 40c communicates with the first connector 16 through the filter 41 and the bore 40b. The bore 40c also communicates (as shown schematically in FIG. 2) with the pilot valve device 14. Note that the fluid conduit 40 may be defined in the body 20 below the plane of the cross-section illustrated in FIG. 1, and thus the features of the fluid conduit 40 are shown in dashed lines, except where the first branch of the fluid conduit 40 is shown connecting the first connector 16 to the third body groove 38, and where the bore 40b intersects with the first branch of the fluid conduit 40.

The body 20 may also define a fluid conduit 42. A first branch of the fluid conduit 42 provides fluid communication between the second connector 18 and the second body groove 36. The fluid conduit 42 may include other branches, in the form of intersecting bores 42a, 42b, and 42c. The intersecting bores 42a, 42b, and 42c may be formed, for example, by drilling through the body 20 from the surface of the body 20, and then closing the outer ends of the bores 42a, 42b, and 42c in some manner, such as by pressing in respective balls 44, which may be followed by deformation of the body 20 by rolling, staking, etc., to capture the balls 44 in their respective bores. The bore 42a communicates with the first body groove 34 and the bore 42b, while the bore 42b communicates with the first branch of the fluid conduit 42, and thus communicates with the second connector 18 and the second body groove 36. The bore 42b may have a shoulder defined therein near the ball 44 pressed into the bore 40b. A second filter 41 is seated against the shoulder in the bore 42b, and is held in place by a respective spring 41a compressed between the filter 41 and the adjacent ball 44. The bore 40c communicates with the first connector 16 through the second filter 41 and the bore 42b. The bore 42c also communicates (as shown schematically in FIG. 2) with the pilot valve device 14. Note that, similar to the fluid conduit 40, portions of the fluid conduit 42 may be defined in the body 20 below the plane of the cross-section illustrated in FIG. 1, and thus most of the features of the fluid conduit 42 are similarly shown in dashed lines Now referring additionally to FIGS. 8, 9, and 10, the spool 29 may have a central portion, indicated generally at 50, between the first end portion 29a and the second end portion 29b. The spool 29 may have a first axial end face, indicated generally at 52 on the first end portion 29a which is in fluid communication with the command chamber 30. The first axial end face 52 may have a central boss 53 formed thereon, the purpose of which will be discussed below. The spool 29 may have a second axial end face, indicated generally at 54, on the second end portion 29b which is in fluid communication with the feedback chamber 32. The second axial end face 54 may have an opening 56 defined therein.

The spool 29 may have a feedback bore in the form of an axial passageway 58 defined therein. The axial passageway 58 may communicate with the opening 56 in the second axial end face 54. The axial passageway 58 may extend from the opening 56 into the central portion 50 of the spool 29. The spool 29 may have an exterior surface 62. The spool 29 may have a circumferentially extending first spool groove 63 formed in the surface 62 at a first axial location in the central portion 50 of the spool 29. One or more ports 64 may provide fluid communication between the spool groove 63 in the exterior surface 62 and the axial passageway 58. The ports 64 are first normally closed ports, in that when the spool 29 is in the normally closed position thereof (shown in FIGS. 1 and 2), the spool groove 63, and thus the ports 64, does not communicate with the bore 40a in the body 20. The spool 29 may define a circumferentially extending second spool groove 65, at a second axial location in the central portion 50 of the spool 29, between the first axial location and the second end portion 29b of the spool 29. One or more second ports 66 provide fluid communication between the axial passageway 58 and the spool groove 65 in the exterior surface 62 of the spool 29. Like the ports 64, the ports 66 are normally closed ports because they are blocked when the spool 29 is in the normally closed position thereof illustrated in FIGS. 1 and 2. In the illustrated embodiment, the port 64 may be one of a plurality of ports spaced apart circumferentially about the spool 29 at the first axial location, and the second port 66 may be one of a plurality of ports spaced apart circumferentially about the spool 29 at the second axial location.

The spool 29 may have a circumferential spool groove 67 formed in the exterior surface 62 at an axial location between the first axial location (the location of the spool groove 63) and the first end portion 29a of the spool 29. The spool 29 may further have an aperture 67a providing fluid communication between the circumferential spool groove 67 and the axial passageway 58 formed in the spool 29. The aperture 67a allows fluid at feedback pressure existing in the axial passageway 58 during equilibrium conditions to be distributed about the spool 29 in the spool groove 67, which, as will become clearer during the discussion of operation below, minimizes the differential pressure between the command chamber 30 and the spool groove 67, and thus minimizes leakage out of the command chamber 30 between the surface 21 defining the bore 22 and the surface 62 of the spool 29.

At a third axial location, between the second axial location (i.e., the location of the spool groove 65) and the second end 29b of the spool 29, a port 68 may be provided to provide communication between the exterior surface 62 of the spool 29 and the axial passageway 58 within the spool 29. In a preferred embodiment for use in a refrigeration application, only one port 68 is provided at the third axial location; suitably, two or more ports 68 may be provided if required for a particular application. The port 68 is a normally open port, in that when the spool 29 is in the normally closed position thereof illustrated in FIGS. 1 and 2, the port communicates with the first groove 34.

The spool 29 may further be provided with one or more circumferentially extending spool grooves 69, which may be relatively shallow compared to the spool groove 67. The spool grooves 69 may have sidewalls that do not extend radially from the bottom of the groove to the outer surface of the spool 29. The sidewalls of the spool groove 69 may extend at an angle relative to one another to describe an acute angle α, which may have any suitable value. For use in a refrigeration application, a value for α of about 60 degrees is believed to be suitable. The spool grooves 69 may be formed in the surface 62, for example, near the second end 29b of the spool 29. The spool grooves 69 are believed to help distribute any leakage that may occur between the outer surface 62 of the spool 29 and the surface 21 defining the bore 22 about the circumference of the spool 29, equalizing pressures and minimizing unequal radial loading on the spool 29 which might occur from circumferentially unequal leakage along the spool 29, thereby minimizing friction between the surface 21 and the surface 62. The spool grooves 69 (only one is illustrated) may be provided at any suitable location, such as the illustrated fourth axial location between the port 68 and the second end 29b of the spool 29.

A circumferential main flow groove 70 is formed in the surface 62 of the spool 29, at a fifth axial position between the third axial location (the location of the spool groove 65) and the second end 29b of the spool 29. The main flow groove 70 is always in fluid communication with the third body groove 38 formed in the interior wall 21 defining the bore 22 in which the spool 29 is disposed. In the embodiment illustrated in FIGS. 1-4, and 8-10, four equally spaced, longitudinally extending grooves 70a are also formed in the surface 62 of the spool at the fifth axial position. Thus, the main flow groove 70 intersects each longitudinal groove 70a at a perpendicular angle, permitting fluid communication therebetween. As will be further explained below, the spool 29 can be moved axially within the bore 22, so that the longitudinal grooves 70a and the main flow groove 70 cooperate to provide a variable cross-section main valve flow path between the third body groove 38 (and thus the first connector 16) and the second connector via either the first body groove 34 or the second body groove 36). The cross-section of the main valve flow path varies with the position of the spool 29: The main valve flow path is closed when the spool 29 is in the normally closed position illustrated in FIGS. 1 and 2; the flow path from the main flow groove 70 through the first body groove 34 and the second body groove 36 is closed off. As the spool 29 is moved away from the normally closed position thereof, a flow path is established between the main flow groove 70 and one of the first body groove 34 and the second body groove 36 (depending upon the direction of movement), initially via the longitudinal grooves 70a for a small flow cross-section, and then eventually directly with the main flow groove 70 to provide a large flow cross-section. As will be further described below, the spool 29 can be moved in a first direction to any of a first range of positions, including a first position illustrated in FIG. 3. Each position in the first range of positions has a different cross-sectional area for fluid communication between the first connector 16 and the second connector 18 through the third body groove 38, the main flow groove 70 (including the longitudinal grooves 70a), and the second body groove 36. Similarly, as will be further described below, the spool 29 can be moved in a second direction in any of a second range of positions, including the second position illustrated in FIG. 4. Each position in the second range of positions has a different cross-sectional area for fluid communication between the second connector 18 to the first connector 16 via the first groove 34, the main flow groove 70 (including the longitudinal grooves 70a), and the third body groove 38.

Referring again to FIGS. 1 and 2, a coil spring 71 may be disposed in the command chamber 30, acting between the pressed-in ball 44 in the first end portion 24 of the bore 22 and the spool 29 to urge the spool 29 toward the second end portion 26 of the bore 22. The boss 53 on the spool 29 may help to radially center the spring 71. Similarly, a coil spring 72 may be disposed in the feedback chamber 32, acting between the pressed-in ball 44 in the second end portion 26 of the bore 22 and the spool 29 to urge the spool 29 toward the first end portion 24 of the bore 22. As illustrated, the second end portion 29b of the spool 29 may be formed with a central boss 73 to help to radially center the spring 72.

The springs 71 and 72 may thus cooperate to urge the spool 29 to the normally closed (shutoff) position, between the first range of positions and the second range of positions of the spool 29, that is, to the shutoff position which is illustrated in FIGS. 1 and 2. More specifically, the spring 71 may urge the spool 29 to move in the first direction from the second range of positions toward the shutoff position, and the spring 72 may urge the spool 29 to move in the second direction from the first range of positions toward the shutoff position.

In the shutoff position illustrated in FIGS. 1 and 2, both the port 64 and the port 66 are positioned so as to not be in fluid communication with the third body groove 38; additionally, neither the port 64 nor the port 66 is in substantial direct fluid communication with the bore 40a, and thus substantially no fluid communication exists between the axial passageway 58 and the first connector 16. In contrast, the second connector 18 does communicate with the axial passageway 58 via the bores 40a and 40b, the first groove 34, and the port 68. Thus, stabilized pressure in the feedback chamber 32 when the spool 29 is in the normally closed position will substantially equal the pressure at the second connector 18, which, depending on direction of flow, may equal supply pressure or return pressure.

Referring to FIG. 2, the pilot valve device 14 may include a pilot valve or valves 80 and fluid passageways interconnecting the pilot valve 80 and the pilot-operated spool valve 12, as will be described below.

The pilot valve 80 may include a fluid conduit 84 extending between a first pilot connection port 86 and a second pilot connection port 88. The first pilot connection port 86 is in fluid communication with the bore 40c, while the second pilot connection port 88 is in fluid communication with the bore 42c. The flow through the fluid conduit 84 may be regulated by two variable orifices in series arrangement in the fluid conduit 84. A variable first orifice 90 may be a normally closed orifice; that is the orifice may be closed in the absence of a command signal to the pilot valve 80. A variable second orifice 92 may be a normally open orifice. A control conduit 94 may be connected in fluid communication with the fluid conduit 84 between the first orifice 90 and the second orifice 92. The pilot valve 80 may be a single valve or microvalve containing moving components acting as the first orifice 90 and the second orifice 92. Alternatively, the pilot valve 80 may be embodied as a plurality of valves or microvalves acting as the first orifice 90 and the second orifice 92. The control conduit 94 communicates with the command chamber 30 via the control port 31.

Preferably, one and only one pressure command used for control of the spool valve 12 is developed in the pilot valve device 14. In the illustrated embodiment, for example, the pressure command is developed in the fluid conduit 84 between the first orifice 90 and the second orifice 92 when pressurized fluid is supplied to the pilot valve 80. The pressure developed there is the command pressure, and fluid at the command pressure is conveyed from the pilot valve device 14 to the command chamber 30 of the spool valve 12. As illustrated herein, the pressure command may be conveyed to the command chamber 30 via the pilot valve control conduit 94 and the control port 31. However, it is contemplated that multiple fluid paths may be used, perhaps even simultaneously, to convey the single pressure command between the point at which the pressure command is developed to the point at which the pressure command is utilized to control the operation of the spool valve 12, and such should be considered within the scope of the claims.

If the pilot valve 80 is a microvalve, the pilot valve 80 may be mounted by any suitable method (such as brazing, soldering, adhesively bonding, mechanical connection, etc.) on the body 20 or an interposed manifold (not illustrated) if suitable to a particular installation. The first pilot connection port 86 is connected in fluid communication with the fluid conduit 42, via the bore 42c, providing uninterrupted fluid communication between the normally closed orifice 90 and the first connector 16. The second pilot connection port 88 is connected in fluid communication with the fluid conduit 46, via the bore 46b, thus providing uninterrupted fluid communication between the normally open orifice 92 and the second connector 18. The pilot valve control conduit 94 is connected in fluid communication with the fluid conduit 31, and the pilot valve control conduit 94 is thus in uninterrupted fluid communication with the command chamber 30.

Operation of the illustrated embodiment will now be discussed.

During operation, the reversible fluid flow control assembly 10 is installed in a system (not shown) via the first connector 16 and the second connector 18. During operation of the system, normally one of the first connector 16 and the second connector 18 will be supplied with a higher pressure (hereinafter "supply pressure") and the other of the first connector 16 and the second connector 18 will be supplied with a lower pressure (hereinafter "return pressure"). During operation, when there are differences between supply pressure and return pressure, the components of the reversible fluid control assembly 10 operate to develop two separate fluid pressures acting in opposition across the spool 29. On one side, the left as drawn in FIGS. 1 through 4, a command pressure developed in the pilot valve device 14 and supplied to the command chamber 30 pushes on the first axial end face 52 of the spool 29 to urge the spool 29 in the first direction (rightward as seen in FIGS. 1 through 4), moving the spool 29 into the first range of positions of the spool 29. A pressure proportional to the position of the spool 29, referred to as feedback pressure, is developed in the axial passageway of the spool 29 as will be described below. The feedback pressure is communicated via the opening 56 from the axial passageway 58 of the spool 29 to the feedback chamber 32 on the right side (as seen in FIGS. 1 through 4) of the spool 29. Feedback pressure in the feedback chamber 32 acting on the second axial end face 54 of the spool 29, urges the spool 29 in the second direction (leftward as seen in FIGS. 1 through 4). The spool 29 is free to move until the forces acting on either end face 52, 54 of the spool 29 balance. Note that in this discussion the forces exerted by the springs 71, 72 will not be discussed, as the springs 71, 72 would normally be chosen to have a very low spring rate, so as to not exert significant force on the spool compared to the fluid forces acting on the axial end faces 52, 54 of the spool 29; if the spring forces are significant, calculation of their effect is relatively simple and predictable balance of forces calculation for one of ordinary skill in the art. In any case, it will be appreciated that it is contemplated that in at least some embodiments, a majority of axial forces acting on the spool 29 to position the spool 29 relative to the body 20 when fluid is flowing through the spool valve 12 will be fluid forces. Note that the main valve flow (i.e., the flow of fluid through the flow control assembly between the first connector 16 and the second connector 18, via the main flow groove 70 does not travel through the axial passageway of the spool 29, and thus does not directly control pressure in the feedback chamber 32. Only fluid flowing through the ports 64, 66, and 68 communicating with the axial passageway 58 directly controls feedback pressure.

The feedback pressure is a pressure developed by positioning the first port 64 (and the associated first spool groove 63) and the second port 66 (and the associated second spool groove 65) in the axial passageway 58 relative to the bore 40a formed in the body 20. During forward flow (shown in FIG. 3), supply pressure is applied to the first connector 16, and the second connector 18 is connected to a downstream return path at return pressure. With the spool 29 in the first range of positions, flow of fluid through the spool valve 12 travels from the first connector 16, through the bores 40b and 40a, through the first spool groove 63, the first port 64, through the axial passageway 58 of the spool 29, through the second port 66, the bores 42a and 42b and then out through the second connector 18, as illustrated in FIG. 3. The feedback pressure in the axial passageway 58 and thus the feedback chamber 32 will be a function of supply pressure, return pressure, and spool position, since the position of the spool 29 determines the cross-sectional flow area through the first port 64 and the normally open port 68. The cross-sectional flow area through the first port 64 is determined by the gap or overlap between the first spool groove 63 and the bore 40a; the cross-sectional flow area through the normally open port 68 is determined by the overlap between the port 68 and the first body groove 34. As the spool 29 moves in the first direction from the normally closed position of FIGS. 1 and 2 toward the first position of FIG. 3, the first port 64 is progressively uncovered, that is, the overlap between the first spool groove 63 (associated with eh first port 64) and the bore 40a increases, and the port 68 remains uncovered and in communication with the first body groove 34.

The feedback pressure is a pressure developed between the first port 64 and the normally open port 68 in the axial passageway 58. During forward flow, with the spool 29 in the first range of positions, flow of fluid through the spool valve 12 travels from the first connection 16, through the first port 64, through the axial passageway 58 of the spool 29, through the normally open port 68 and then out through the second connection 18. In a forward flow position, such as is illustrated in FIG. 3, the third body groove 38 is in fluid communication with the second connector 18 and thus will be at return pressure, while the second body groove 36, which is in fluid communication with the first connector 16, will be at supply pressure. As the second port 66 is progressively uncovered, pressure in the axial passageway 58 will rise. However, feedback pressure will not rise to the magnitude of supply pressure, since the third port 68 will be continually venting fluid from the axial passageway 58 to the first body groove 34, which is at return pressure. The feedback pressure in the feedback chamber 32 will equal the pressure in the axial passageway 58 once steady state operating conditions exist. During transient conditions, the pressure in the feedback chamber 32 may lag the pressure in the axial passageway due to the damping effect of the orifice 59. However, this lag may be ignored for the purpose of analyzing the steady-state-to-steady-state operation of the reversible fluid control assembly 10.

Both the command pressure and the feedback pressures may fall between supply pressure and return pressure in normal operation, as described above.

Referring now to FIG. 2, in transitioning from the normally closed (shutoff) condition of the spool valve 12 to control of forward flow (supply pressure at the first connector 16, and return pressure at the second connector 18), command pressure is developed in the pilot valve 80 as follows. Initially, the pilot valve 80 is deenergized, and the first orifice 90 is closed and the second orifice 92 is fully open; the command chamber 30 is isolated from supply pressure at the first connector 16 by the first orifice. Instead, the command chamber 30 is at return pressure, since the command chamber 30 is connected to the second connector 18 via the fully open second orifice 92. As an electrical signal is supplied to energize the pilot valve 80, the first orifice 90 to begin to open and the second orifice 92 to begin to close, causing command pressure to rise.

During forward flow operations, fluid will be flowing from the first connector 16 through the fluid conduit 42, the bore 42c, the first pilot connection port 86 through the orifice 90 of the pilot valve device 14, to a lower pressure region between the orifice 90 and the orifice 92 (where command pressure is tapped off and sent to the command chamber 30 of the pilot-operated spool valve 12). From this lower pressure region, fluid continues to flow through the orifice 92, the second pilot connection port 88, the bore 46b and the fluid conduit 46 to the second connector 18.

Command pressure will increase to maximum when the electrical signal energizes the pilot valve 80 such that the first orifice 90 is fully open, and the second orifice 92 is fully closed. In this situation, in steady state conditions, substantially the full supply pressure from the first connector 16 is directed as a maximum command pressure to the command chamber 30, urging the spool 29 most fully in the first direction (rightward as seen in FIG. 3). In between the fully deenergized state and the fully energized state, command pressure varies with a positive correlation to the command signal to the pilot valve 80 as a percentage of the maximum differential pressure across the pilot valve 80. If the first orifice 90 and the second orifice 92 are of the same size, the command pressure may be equal to half of supply pressure when both the first orifice 90 and the second orifice 92 are half-open.

As the spool 29 begins to move in the first direction due to increasing pressure in the command chamber, initially the normally closed first port 64 may remain closed due to valve overlap, and feedback pressure in the feedback chamber 32 remains constant, which is to say equal to return pressure, since the normally open port 68 connects the feedback chamber 32 to the second connector 18, which is at return pressure during forward flow. This establishes differential pressure acting on the spool 29 that urges the spool 29 further in the first direction. After a small amount of movement of the spool 29, the normally closed port 64 may begin to open, permitting a throttled stream of fluid from the first connector to flow into the axial passageway 58 of the spool 29, and thence out the normally open port 68 to the second connector 18, causing feedback pressure to begin to rise. Further movement of the spool 29 in the first direction causes the normally closed port 64 to further open, and eventually begins to cause the normally open port 68 to begin to close. This causes further increases in feedback pressure, until feedback pressure rises sufficiently to restore the force balance on the spool 29, halting further movement of the spool 29 in the first direction. As the spool 29 was moving from the normally closed position to the new position in the first range of positions, the main valve flow begins to flow through the main flow groove 70 on the spool 29, as discussed above, and rises to the flow rate determined by the position of the spool 29 (and more specifically, by the cross-sectional flow areas in the main valve flow path and the difference between the supply and return pressures. If the signal to the pilot valve 80 is increased to a maximum, the command pressure will rise to a maximum, as described above, and the command pressure will urge the spool 29 in the first direction to the maximum rightward position, as shown in FIG. 3. In this position, the main flow groove 70 has equal flow cross-sectional area into the second body groove 36 and the third body groove 38, and the main valve flow is maximized. Decreasing the signal to the pilot valve 80 decreases command pressure by closing the first orifice 90, throttling flow from the supply pressure at the first connector, and opening the second orifice 92 to return pressure. With command pressure in the command chamber 30 decreased, feedback pressure will momentarily exceed command pressure, urging the spool 29 in the second direction. This throttles flow between the normally closed first port 64 and the normally open port 68, lowering feedback pressure. When feedback pressure and command pressure are equalized, the spool 29 will stop at a new position in which main valve flow will be decreased owing to decreased flow area between the main flow groove 70 and the second body groove 36.

In reverse flow conditions, as illustrated in FIG. 4, the supply pressure is applied to the second connector 18, and the first connector 16 is at return pressure. When these reverse flow conditions exist, and the spool 29 is initially in the normally closed position illustrated in FIG. 2, command pressure will be at maximum, because the second orifice 92b of the pilot valve 80 is fully open, the first orifice 90 is fully shut, and supply pressure is directed from the second connector 18 through the second orifice 92b to the command chamber 30. However, feedback pressure will also be at maximum, since the feedback chamber 32 is supplied with full supply pressure via the second connector 18, the fluid conduit 42, the first groove 34, the normally open port 68, and the axial passageway 58 of the spool 29. Both of the normally closed ports 64 and 66 in the spool 29 are blocked when the spool 29 is in the normally closed position; there is no fluid path from the feedback chamber 32 to return pressure at the first connector 16. Therefore, the fluid pressure forces acting on the ends of the spool 29 will balance, and the springs 71 and 72 will keep the spool 29 in the normally closed position shown in FIGS. 1 and 2.

Positioning of the spool 29 during reverse flow operations is, as with operations in forward flow operations, a question of balancing the pressure (and to a small extent, spring) forces on the spool 29. The following equation shows how these forces may be balanced (in steady state conditions):

$$F_{s1}+(P_c*A_{sc})=F_{s2}+(P_f*A_{sf}) \qquad \text{Equation 1}$$

where:
$F_{s1}$ is the force exerted by the spring 71 in the command chamber 30;
$P_c$ is the pressure in the command chamber 30;
$A_{sc}$ is the area of the spool 29 acted on by the command pressure $P_c$;
$F_{s2}$ is the force exerted by the spring 72 in the feedback chamber 32;
$P_f$ is the pressure in the feedback chamber 32; and
$A_{sf}$ is the area of the spool 29 acted on by the feedback pressure $P_f$.

Note that in a constant diameter spool 29, such as illustrated in FIGS. 1 through 4, $A_{sf}$ is equal to $A_{sc}$.

Furthermore, feedback pressure can be calculated according to the following equation:

$$Pf=A_2^2/(A_2^2+A_1^2) \qquad \text{Equation 2}$$

where:
$P_f$ is the pressure in the feedback chamber 32
$A_2$ is the cross-sectional flow area through the port on the low pressure side (i.e., the port 66); and
$A_1$ is the cross-sectional flow area through the port on the high pressure side (i.e., the normally open port 68).

Figure 6:
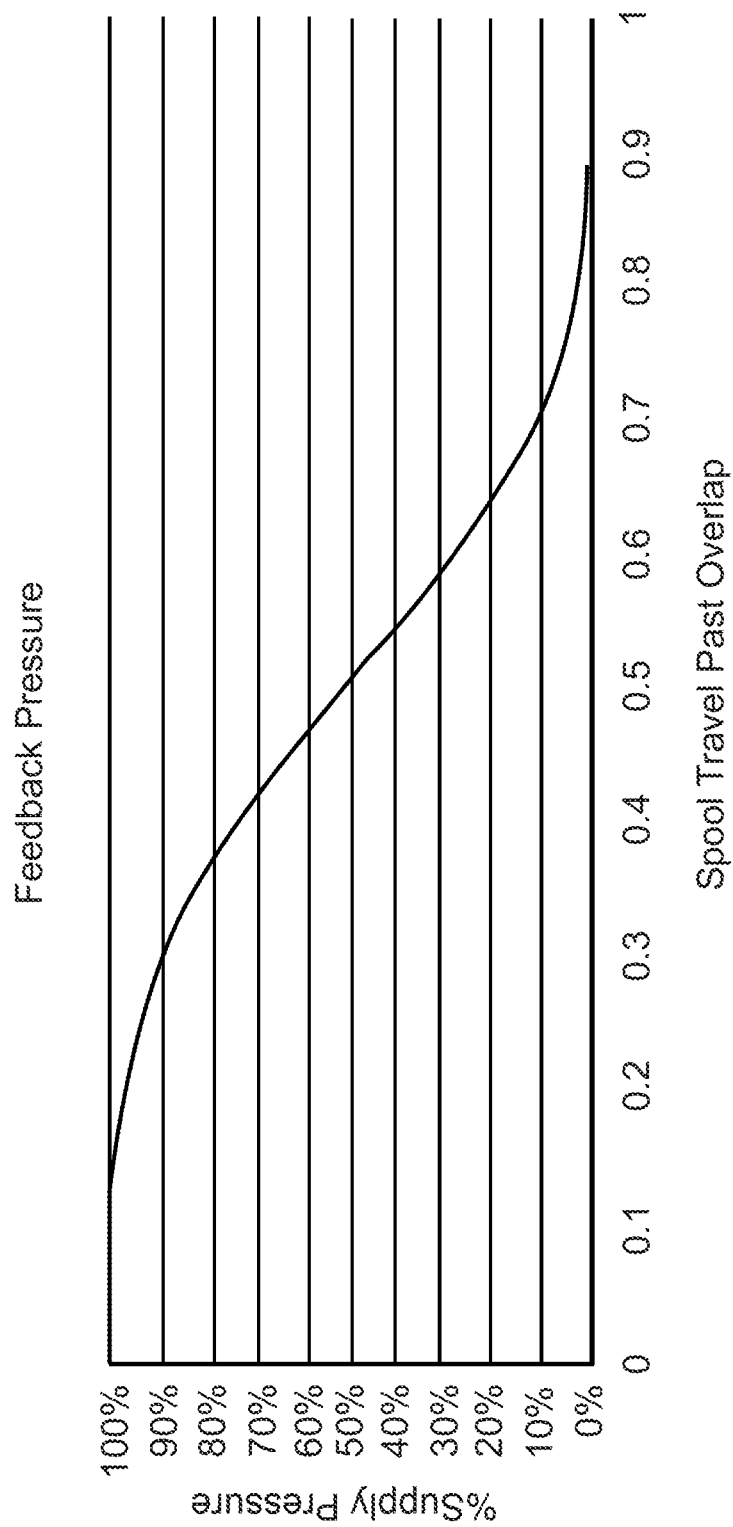
FIG. 6 is an exemplary graph of the calculated feedback pressure versus spool travel contained in the table of FIG. 5.
Figure 7:
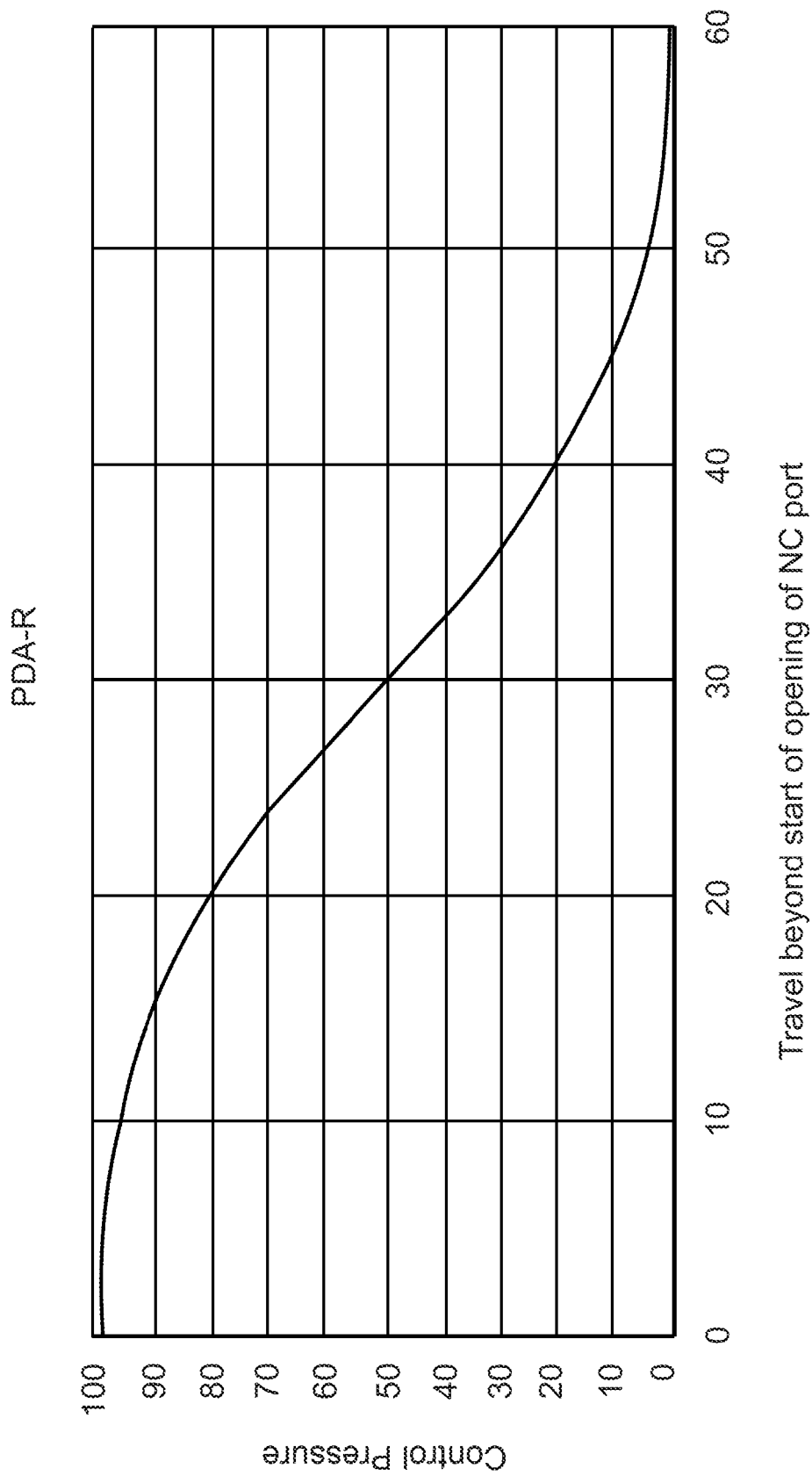
FIG. 7 is an exemplary graph of calculated feedback pressure versus spool travel contained in the table of FIG. 5 as a ratio to supplied pressure.

Referring now to FIG. 5, data collected from a model of one example of the flow control assembly 10 is presented, illustrating the calculated cross-sectional flow areas of the ports 66 and 68 for various amounts of travel of the spool 29, and calculations of feedback pressure (as a factor of the differential pressure between supply pressure and return pressure). FIG. 6 is a graph illustrating the feedback pressure data from FIG. 5 as a percentage of supply pressure (assuming that return pressure is zero). FIG. 7 illustrates a correlation of travel of a valve member within a microvalve acting as the pilot valve 80 (in microns—after the normally closed orifice 90 thereof begins to open) with to the resultant control pressure as a percentage of supply pressure (assuming that the return pressure is zero). The microvalve used to model the pilot valve 80 in this example was a PDA-3 microvalve, a micromachined 3-way valve available from DunAn Microstaq, Inc. of Austin, Tex.

During reverse flow operations, fluid will be flowing from the second connector 18 through the fluid conduit 46, the bore 46b, the second pilot connection port 88 through the orifice 92, and into the lower pressure region between the orifice 92 and the orifice 90, and pressure of the fluid drops passing through the orifice 92 to become command pressure., fluid continues to flow to the second connector 18. From this lower pressure region, fluid continues to flow through the orifice 90, the first pilot connection port 86, the bore 42b and the fluid conduit 42, and to the return piping connected to the first connector 16. Note that the direction of flow of fluid through the pilot valve device 14 during reverse flow operations is opposite the direction of flow of fluid through the pilot valve device 14 during forward flow operations.

When the pilot valve 80 begins to be energized, pressure in the command chamber 30 will begin to drop due to opening of the first orifice 90 to bleed off command pressure $P_c$ to return via the fluid conduit 40 and the first connector 16 (and initially to a much lesser extent, throttling of supply pressure as the second orifice 92 begins to shut). This causes a pressure imbalance as feedback pressure $P_f$ will remain high, since the normally closed port 66 will initially remain shut, and the normally open port 68 remains fully open. After approximately 1 millimeter of travel of the spool 29 (in the model used to generate the data of FIGS. 5, 6 and 7), the normally closed port 66 will begin to open, and feedback pressure $P_f$ will begin to drop. However, initially the spool 29 will move until the differential forces acting across the spool 29 are balanced. Thus, for a small initial command signal, resulting in a small drop in command pressure, and no change in feedback pressure, compression of the spring 71 in the command chamber 30 may result in sufficient increased force in the first direction to counter the force due to the difference in pressures between the feedback pressure and the control pressure in the second direction. With the axial forces acting on the spool 29 balanced, the spool 29 will stop at an equilibrium position within the second range of positions. If the command signal is further increased, command pressure will further drop, and the spool 29 will advance further in the second direction, allowing the normally closed port 66 to open, and begin to decrease the feedback pressure until the axial forces acting on the spool 29 are again balanced in new position within the second range of positions between the position shown in FIG. 4 and the normally closed position of the spool 29 shown in FIG. 1. If the signal to the pilot valve 80 is increased to near maximum, command pressure will drop to near minimum and the spool 29 will be moved to the position shown in FIG. 4 in which the normally closed port 66 is fully open, and the normally open port 68 is nearly fully closed. The main flow path through the spool valve 12 will be substantially opened fully, that is, the main flow groove 70 has equal flow cross-sectional area into the first body groove 34 and the third body groove 38, and the main valve flow from the second connector 18, through the main flow groove 70, to the first connector 16 is maximized.

Note that in some anticipated embodiments, if the signal to the pilot valve 80 is increased to maximum, so that the normally closed first variable orifice 90 is fully open, and the normally open second variable orifice 92 is fully closed, command pressure will drop to return pressure. With command pressure equal to return pressure, and the spool 29 able to be moved to a position where the normally open port 68 shuts completely (i.e., the normally open port 68 cannot communicate with the first groove 34), then feedback pressure may also drop to return pressure, equal to command pressure. In such a situation, the spring 71 in the command chamber 30 will be compressed, and the spring 72 in the feedback chamber 32 will be uncompressed, and, with no pressure differential, the net force of the springs 71 and 72 will urge the spool 29 in the first direction a short distance until the normally open port 68 re-opens slightly, raising feedback pressure and urging the spool 29 back in the second direction. In such a case, the spool 29 may move to an intermediate balanced position, or may oscillate (generally insignificantly) near the position shown in FIG. 4. If such a condition is not desired in a particular application, the structure of the spool valve 12 may be designed to prevent the normally open port 68 from fully closing at any position within the second range of positions.

Referring again to FIG. 3, it is further anticipated that in some embodiments of the flow control assembly 10, a similar situation may be possible during forward flow conditions. The normally closed variable orifice 90 is fully open, and the normally open variable orifice 92 is fully closed, command pressure will equal supply pressure. If the spool 29 is moved so far in the first direction that the normally open port 68 fully closes, and feedback pressure will equal supply pressure, and thus command pressure, resulting in no imbalance of forces due to pressure differentials between ends of the spool 29, but with the spring 72 in the feedback chamber 32 being compressed, and the spring 71 in the command chamber 30 being uncompressed. This may result in the movement of the spool 29 in the second direction without change in the command signal to the pilot valve 80 or change in command pressure, until the normally open variable orifice 92 reopens. Again, if this situation is undesired, one may adjust the structure of the flow control assembly 10 such that there are no positions of possible movement within the first range of positions in which the normally open variable orifice 92 can fully close.

When it is desired to command a reduction, the main flow groove 70 has equal flow cross-sectional area into the second body groove 36 and the third body groove 38, and the main valve flow is maximized. Decreasing the signal to the pilot valve 80 decreases command pressure by closing the first orifice 90, throttling flow from the supply pressure at the first connector, and opening the second orifice 92 to return pressure. With command pressure in the command chamber 30 decreased, feedback pressures will momentarily exceed command pressure, urging the spool 29 in the second direction. This throttles flow between the normally closed first port 64 and the normally open port 68, lowering feedback pressure. When feedback pressure and command pressure are equalized, the spool 29 will stop at a new position in which main valve flow will be decreased owing to decreased flow area between the main flow groove 70 and the second body groove 36.

Referring now to FIGS. 11 and 12, a spool 129, which is an alternate embodiment of the spool 29 of the spool valve 12, is shown. The spool 129 differs from the spool 29 in that instead of four longitudinal grooves 70a in the exterior surface 62 of the spool 29, the spool 129 has six longitudinal slots 170a, each having a width, length, and depth equal to one of the longitudinal grooves 70a of the above-described embodiment. Thus, the spool 129 may have a different valve characteristic, in that the main valve flow through the main flow groove via the longitudinal grooves 170a will have a greater total cross-sectional flow area, and allowing an increased volume of flow for the same longitudinal spool position and differential pressure across the spool valve 12. In addition, main valve flow may rise more rapidly for each increment of spool travel as the six longitudinal grooves 170a are unblocked compared to the four longitudinal grooves 70a, all other parameters being the same. In other words, the valve characteristic curve of the spool valve 12 with the spool 129 may have a different slope or shape compared to the valve characteristic curve of the spool valve 12 with the spool 29.

Figure 13:
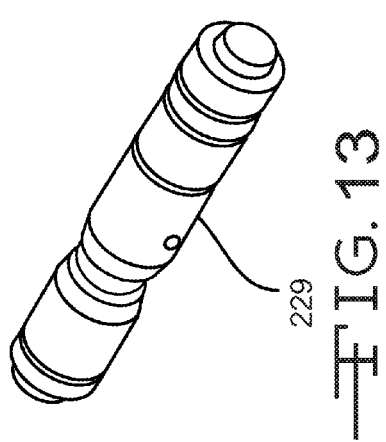
FIG. 13 is a view similar to FIG. 10, but showing a second alternate embodiment of a spool.
Figure 14:
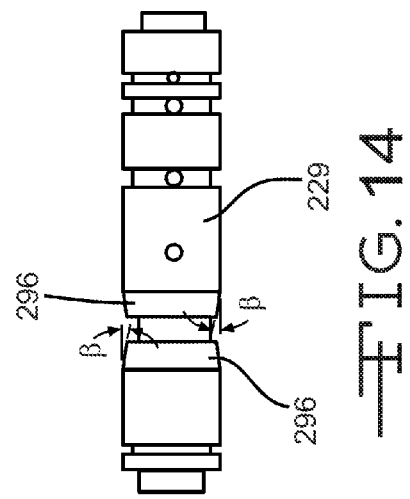
FIG. 14 is a side view of the spool of FIG. 13

Referring now to FIGS. 13 and 14, a spool 229, which is an alternate embodiment of the spool 29 of the spool valve 12, is shown. The spool 229 differs from the spool 29 in that instead of four longitudinal grooves 70a in the exterior surface 62 of the spool 29, the spool 229 has two inwardly tapered surfaces 296 on either side of the main flow groove thereof. The surfaces 296 may be inclined at any suitable angle $\beta$ to the surface of the spool 229, such as at an angle $\beta$ of between about three degrees and about thirty degrees to the surface. In one application, an angle $\beta$ of about ten degrees to the surface is believed to be suitable. Thus, the spool 229 may have a different valve characteristic, in that the main valve flow into the main flow groove via the annular gap between the surfaces 296 and the inner wall 21 of the bore 22 may have a different total cross-sectional flow area at a particular position of the spool 229, allowing a different volume of main valve flow for the same longitudinal spool position and differential pressure across the spool valve 12. In addition, main valve flow may rise more or less rapidly for each increment of spool travel as the annular flow area adjacent the tapered surfaces 296 compared to the four longitudinal grooves 70*a*, all other parameters being the same. In other words, the valve characteristic curve of the spool valve 12 with the spool 229 may have a different slope or shape compared to the valve characteristic curve of the spool valve 12 with the spool 29 or the spool 129.

Figure 15:
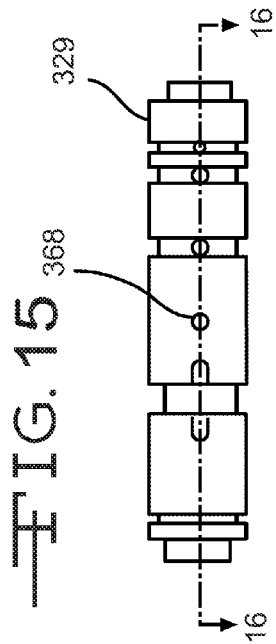
FIG. 15 is a side view similar to FIG. 14, but showing a third alternate embodiment of a spool
Figure 16:
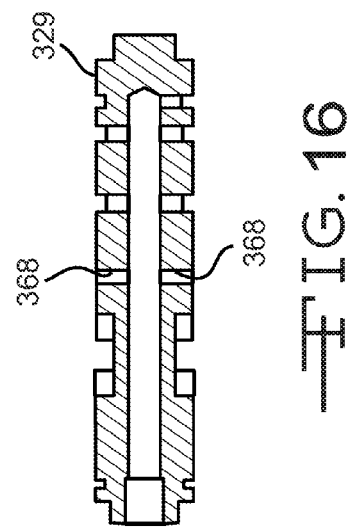
FIG. 16 is a sectional view of the spool illustrated in FIG. 15, taken along the line 16-16 of FIG. 15.

Referring now to FIGS. 15 and 16, a spool 329, which is an alternate embodiment of the spool 29 of the spool valve 12, is shown. The spool 329 differs from the spool 29 in that instead of having a single normally open port 68 at the third axial location, the spool 329 has two normally open ports 368. Thus, the total cross-sectional flow area for flow into or out of the spool 329 at the third axial location is substantially increased compared to the spool 29, allowing a different volume of fluid flow in the feedback pressure generating flow path through the spool 329 compared to the spool 29. This may change the response time to develop a feedback pressure in the spool valve 12 using the spool 329, or other valve characteristic, compared to the spool valve 12 using the spool 329, all other parameters being the same. In other words, the damping characteristics of the spool valve 12 with the spool 329 may be different compared to the damping characteristic of the spool valve 12 with the spool 29, the spool 129, or the spool 229.

Note that in the flow control assembly 10 described above, the pilot-operated spool valve 12 has a spool 29 that moves from the shutoff position illustrated in FIGS. 1 and 2 to a range of operating positions in the first direction from the shutoff position to control the flow of fluid through the spool valve 12 from the first connector 16 to the second connection 18. Further note that the spool 29 moves from the shutoff position illustrated in FIGS. 1 and 2 to range of operating positions in the second direction from the shutoff position to control the flow of fluid through the spool valve 12 from the second connector 18 to the first connector 16. Further note that the direction of flow of fluid through the pilot valve device 14 during reverse flow operations is opposite the direction of flow of fluid through the pilot valve device 14 during forward flow operations.

Referring now to FIGS. 17 through 23E, we will describe various aspects of another embodiment of a flow control assembly, indicated generally at 510. As will be described below, in contrast to the flow control assembly 10, the flow control assembly 510 includes a pilot-operated spool valve 512 that moves from a shutoff position in one direction to a range of operating position which are utilized regardless of the direction of fluid flow through the spool valve 512. The flow control assembly 510 further includes a pilot valve 514 for controlling the spool valve 512, which pilot valve 514 is connected to a valve arrangement, indicated generally at 517, in the form of a fluid rectifier (Wheatstone bridge type fluid circuit) that ensures that fluid only passes in a single unitary direction through the pilot valve 514, regardless of which direction fluid is flowing through the spool valve 512.

Figure 17:
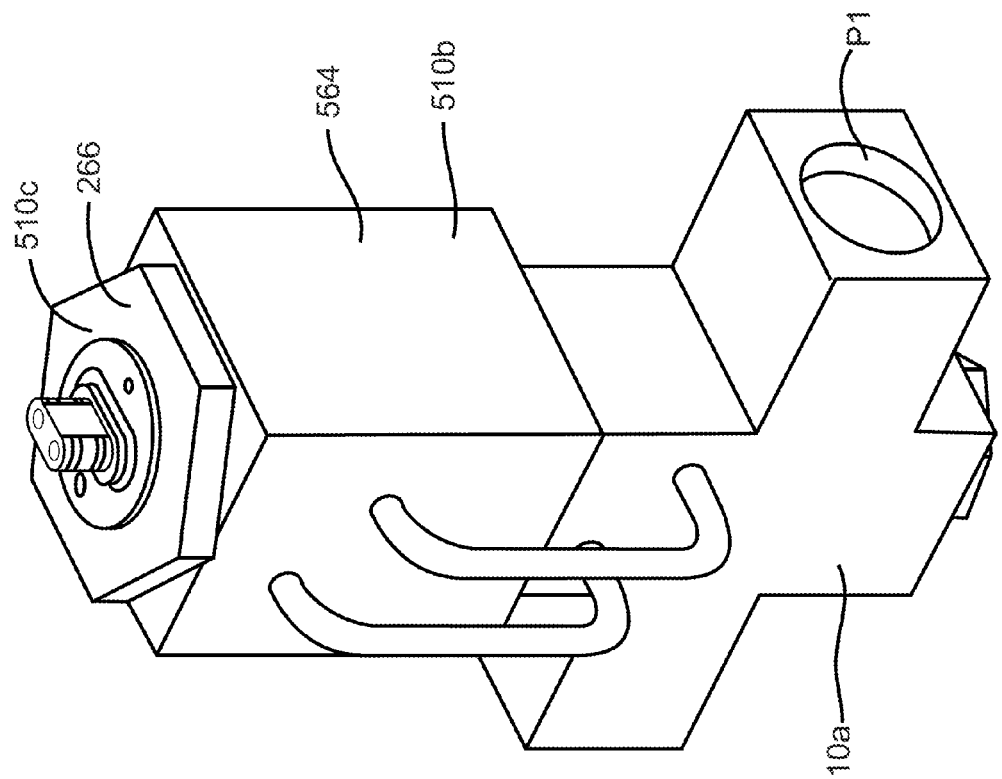
FIG. 17 is a perspective view of an embodiment of a flow control assembly.

FIG. 17 is a perspective view of the flow control assembly 510, showing a front surface 510*a*, a first side surface 510*b*, and a top surface 510*c* of the flow control assembly 510. As indicated in, for example, FIGS. 19 and 20, the flow control assembly 510 also has a second side surface 510*d* opposite the first side surface 510*b*, a rear surface 510*e* opposite the front surface 510*a*, and a bottom surface 510*f* opposite the top surface 510*c*. The flow control assembly 510 may be utilized, for example, as an expansion valve assembly in a heat pump system in which the direction of fluid (refrigerant) flow during cooling mode operations is reversed from the direction of fluid flow during heating mode operations. The pilot operated main spool valve 512 is illustrated in FIGS. 19A and 22D as being disposed in a valve housing 564 within which the pilot valve 514 is also mounted, although such is not required. The pilot operated main spool valve 512 may be placed in any suitable environment. The valve housing 564 may include two connection ports, a first connector P1 (formed through the first side surface 510*b*) and a second connector P2 (seen in FIG. 22, formed through the second side surface 510*d*) for connecting the flow control assembly 510 to the system in which the flow control assembly 510 is to be installed. It will be understood that when the flow control assembly 510 is installed in a system which supplies pressurized fluid to the first connector P1, and the fluid flows through the flow control assembly 510 and out the second connector P2 to return to the system, the pressure of the fluid at the first connector P1 will be higher than the pressure of the fluid at the second connector P2. On the other hand, when fluid flow through the system is in the opposite direction, so that the system supplies pressurized fluid to the second connector P2, and the fluid flows through the flow control assembly 510 and out the first connector P1 to return to the system, the pressure of the fluid at the second connector P2 will be higher than the pressure of the fluid at the first connector P1.

The valve housing 564 may include a variety of passageways and ports for interconnecting different portions of the flow control assembly. The passageways and ports may be formed in the valve housing 564 by any suitable method, such as by drilling, and by pressing in balls 565 to seal portions of drilled passageways in a known manner, such as is shown in FIGS. 20, 20B, 21, and 21C.

Figure 18:
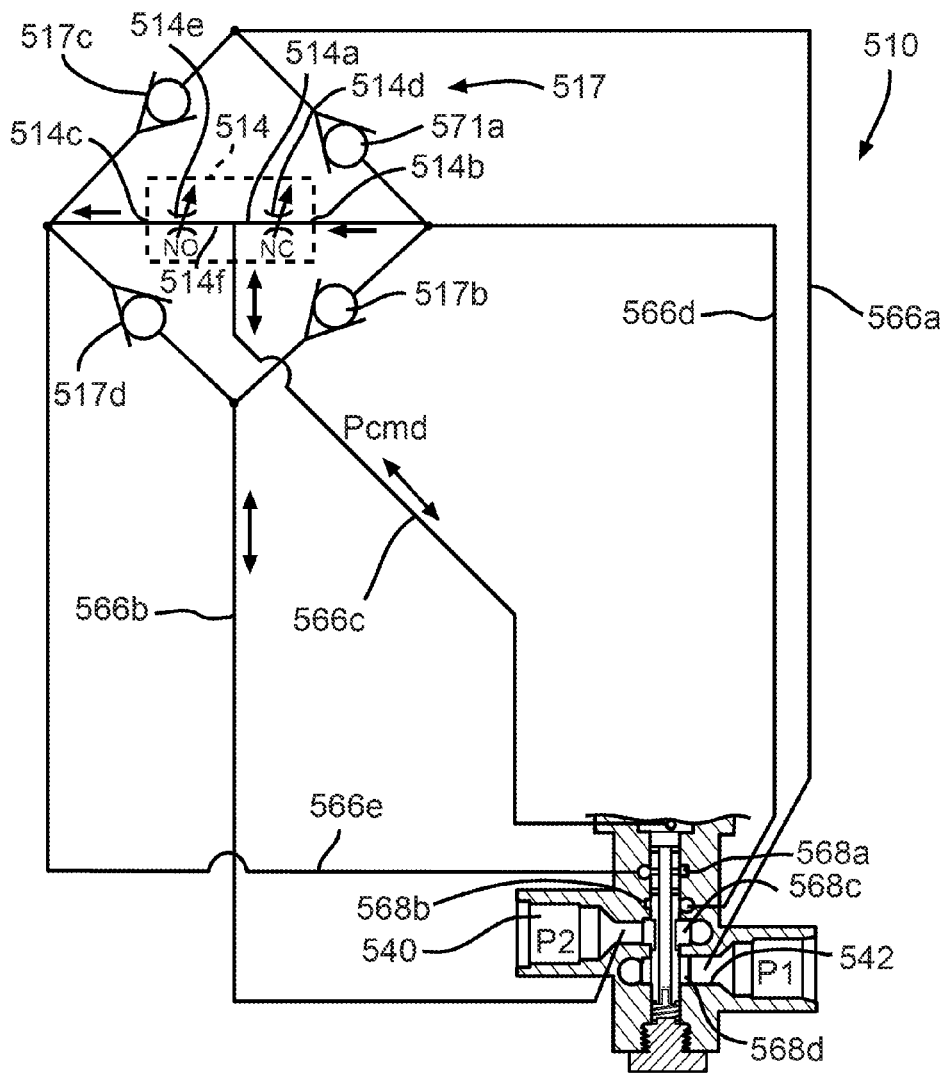
FIG. 18 is a schematic diagram of the flow control assembly of FIG. 17.

Referring now to FIG. 18, in a preferred embodiment, the pilot valve 514 is an open center 3-way valve, most preferably embodied as a microvalve such as the PDA-3 microvalve, a micromachined 3-way valve available from DunAn Microstaq, Inc., of Austin, Tex. The pilot valve 514 has an internal fluid passageway 514*a* providing fluid communication from an inlet 514*b* to an outlet 514*c*. The three-way valve preferably utilized as the pilot valve 514 has a moveable member (not shown) that interacts with ports of the valve to provide two simultaneously acting variable orifices: A normally closed upstream variable orifice 514*d* is disposed in the fluid passageway 514*a* next to the inlet 514*b*, and a normally open downstream variable orifice 514*e* is disposed in the fluid passageway 514*a* between the upstream variable orifice 514*e* and the outlet 514*c*. An intermediate portion 514*f* of the fluid passageway 514*a* is defined between the upstream variable orifice 514*d* and the downstream variable orifice 514*e*. As fluid flows through the fluid passageway 514*a*, a first pressure drop may occur as fluid passes through the upstream variable orifice 514*d*, and a second pressure drop may occur as fluid passes through the downstream variable orifice 514*e*. The relative magnitudes of the first pressure drop and the second pressure drop, together with the pressures seen at the inlet 514*b* and the outlet 514*c* determines the pressure in the intermediate portion 514*f* of the fluid passageway 514*a*.

A first fluid passageway 566*a* provides fluid communication between the first connector P1 and the valve arrangement indicated generally at 517. A second fluid passageway 566*b* provides fluid communication between the second connector P2 and the valve arrangement 517. The valve arrangement 517 may be viewed as an assemblage of check valves and the pilot valve 514 in a Wheatstone bridge type structure. More specifically, the valve arrangement 517 includes a first check valve 517a, a second check valve 517b, a third check valve 517c, and a fourth check valve 517d are connected to form a fluid rectifier circuit for supplying a fluid from the one of the first connector P1 and the second connector P2 which is at the higher pressure to the pilot valve inlet port 514b. The valve arrangement 517 also supplies fluid from the pilot valve outlet port 514c to the one of the first connector P1 and the second connector P2 which is at the lower pressure so that flow through the pilot valve 514 is always from the pilot valve inlet 514b to the pilot valve outlet 514c without regard to which one of the first connector P1 and the second connector P2 is at the higher pressure.

Referring to FIGS. 23 and 23E, enlarged views are provided of a check valve of a type suitable for use as one of the check valves 517a-d. It should be understood that FIGS. 23 and 23E illustrate only one of many possible types of check valves that may be suitable for use. The check valve illustrated in FIGS. 23 and 23E is a ball check valve made of three components: a ball 575, a cup-shaped seat 576, and a cage 577. The seat 576 has a central hole 576a formed therein, through which fluid flows, and a conical seating surface 576b about the central hole, against which the ball 575 can be urged by fluid pressure to stop the flow of fluid through the hole. The ball 575 is retained in close proximity to the seating surface 576b by the cage 577, especially under conditions of reverse flow, where fluid flowing through the hole 576a unseats the ball 575, and urges it away from the seating surface 576b. The cage 577 has a plurality of holes formed therein to provide a fluid flow path through the check valve when the ball 575 is unseated.

Referring again to FIG. 18, the check valve 517a is connected to permit fluid flow from the first connector P1 via the first passageway 566a to the pilot valve inlet 514b, and prevents fluid flow from the pilot valve inlet 514b to the first passageway 566a. The check valve 517b is connected to permit fluid flow from the second connector P2 via the second passageway 566b to the pilot valve inlet 514b, and prevents fluid flow from the pilot valve inlet 514b to the second passageway 566b. If fluid pressure is higher at the first connector P1 than at the second connector P2, the check valve 517a will open to supply fluid from the first connector P1 to the pilot valve inlet 514b; since the pressure at the pilot valve inlet 514b will thus be at the higher pressure of the connector P1, the check valve 517b connecting the pilot valve inlet 514b to the second connector P2 will shut under reverse pressure. If fluid pressure is higher at the second connector P2 than at the first connector P1, the check valve 517b will open to supply fluid from the second connector P2 to the pilot valve inlet 514b; since the pressure at the pilot valve inlet 514b will thus be at the higher pressure of the connector P2, the check valve 517a connecting the pilot valve inlet 514b to the first connector P1 will shut under reverse pressure. Note that the check valve 517a and check valve 517b cooperate to prevent fluid flowing between the first connector P1 and the second connector P2 through both of these check valves bypass either the pilot valve 514 or the spool valve 512.

The check valve 517c is connected to permit fluid flow from the pilot valve outlet 514c via the first passageway 566a to the first connector P1, and prevents fluid flow from the first connector P1 to the pilot valve outlet 514c via the first passageway 566a. The check valve 517d is connected to permit fluid flow from the pilot valve outlet 514c to the second connector P2 via the second passageway 566b, and prevents fluid flow from the second connector P2 via the second passageway 566b to the pilot valve outlet 514c. If fluid pressure is higher at the first connector P1 than at the second connector P2, then the pilot valve 514 is being supplied with fluid from the first connector P1, and the check valve 517d will open to return fluid from the pilot valve 514 (specifically the pilot valve outlet 514c) to the lower pressure second connector P2 via the second passageway 566b. Since the pressure at the pilot valve inlet 514b will thus be lower than the pressure of the connector P1, the check valve 517c connecting the pilot valve outlet 514b to the first connector P1 will shut under reverse pressure. If fluid pressure is higher at the second connector P2 than at the first connector P1, the check valve 517c will open to supply fluid from the pilot valve outlet 514b to the first connector P1, and the check valve 517d will be shut under reverse pressure. Note that the check valve 517c and check valve 517d cooperate to prevent fluid flowing between the first connector P1 and the second connector P2 through both of these check valves to bypass either the pilot valve 514 or the spool valve 512.

It should be noted that other embodiments of the valve arrangement 517 are contemplated that may perform the same function as the valve arrangement 517 illustrated in FIG. 18 and discussed above. For example, it is contemplated that in some applications it may be suitable to replace the check valve 517a and the check valve 517b with a single shuttle valve. Such other embodiments are considered to be within the broad scope of the invention as claimed herein.

Still referring to FIG. 18, it should be noted that a fourth passageway 566d is provided in fluid connection with the pilot valve inlet 514b and the check valves 517a and 517b. The fourth passageway 566d is connected to the pilot-operated spool valve 512 in a manner and for a purpose that will be discussed below. However, it should be noted that since the fourth passageway 566d is in fluid communication with the pilot valve inlet 514b, the valve arrangement 517, while acting to supply fluid from the higher pressure of the first connector P1 and the second connector P2 to the pilot valve inlet 514b as described above, also acts to supply fluid from the higher pressure of the first connector P1 and the second connector P2 to the spool valve 512 via the fourth passageway 566d.

It should also be noted that a fifth passageway 566e is provided in fluid connection with the pilot valve outlet 514c and the check valves 517c and 517d. The fifth passageway 566e is connected to the pilot-operated spool valve 512 in a manner and for a purpose that will be discussed below. However, it should be noted that since the fifth passageway 566e is in fluid communication with the pilot valve outlet 514c, the valve arrangement 517, while acting to deliver fluid from the pilot valve outlet 514c to the lower pressure of the first connector P1 and the second connector P2 as described above, also acts to connect the spool valve 512 to the whichever of the first connector P1 and the second connector P2 is at the lower pressure via the fifth passageway 566e for a purpose which will be described below.

Still referring to FIG. 18, the fluid pressure developed in the intermediate portion 514f of the fluid passageway 514a of the pilot valve 514 is supplied to the pilot operated spool valve 512 as a command pressure, $P_{cmd}$, via a third fluid passageway 566c. The pilot valve 514 receives a command signal, preferably in the form of an electrical signal (though the use of other forms of command signals, such as pneumatic, hydraulic, or mechanical are contemplated) and a control element (not shown) is positioned so as to vary the cross-sectional flow areas of the upstream variable orifice 514d and the downstream variable orifice 514e, thereby correspondingly adjusting the fluid pressure in the intermediate portion 514f, and thus correspondingly varying the command pressure, $P_{cmd}$, supplied to the spool valve 512.

As noted above, the three-way valve preferably utilized as the pilot valve 514 has a moveable member (not shown) that interacts with ports of the valve to provide two simultaneously acting variable orifices. However, it is also contemplated that similar functionality could be achieved by utilizing two valves controlled in concert to provide two simultaneously acting variable orifices. Therefore, it should be understood that the term "valve" as used herein is defined to include the plural, that is, the use of multiple valves to achieve the functionality of a single valve.

The pilot valve 514 is secured to the valve housing 564 via a mounting structure 566, as may be seen in FIG. 19A, although such is not required. It must be understood that the pilot valve 514 may be suitably arranged anywhere physically possible in any manner in the flow control assembly 510. The mounting structure 566 may additionally function as a plug that seals a first end of a bore 568 formed in the valve housing 564. The mounting structure 566 may define a portion of the first passageway 566a for connecting the pilot valve 514 to the first connector P1, and may define a portion of the second passageway 566b for connecting the pilot valve 514 to the second connector P2. As noted above, the pilot valve 514 may be suitably arranged anywhere physically possible; in the embodiment illustrated in FIG. 19A, the pilot valve 514 is physically mounted on an inner axial end of the mounting structure 566, in a command chamber 530 communicating with the spool valve 512. In such case, the third passageway 566c for connecting the pilot valve 514 to apply command pressure to the spool valve 513 may be embodied simply as a port in the pilot valve 514 in fluid communication with the command chamber 530. Thus, the pilot valve 514 in the embodiment illustrated in FIGS. 19A and 22D may be of a flow-through design, with fluid connection ports on both the top and bottom (as viewed in FIGS. 19A and 22D) faces of the pilot valve 514. Note that the pilot valve 514 could alternatively be formed differently, such as with all fluid connection ports being formed in the upper face (as viewed in FIGS. 19A and 22D), and the third passageway 566c being formed in the mounting structure 566 to connect the pilot valve 514 to apply command pressure to the spool valve 513. Further note that the mounting structure 566 may alternatively be disposed elsewhere on the valve housing 564, and a separate plug (not shown) provided to seal the first end of the bore 568.

As described above, the mounting structure 566 seals a first end of the bore 568. A threaded plug 569 may be provided to seal a second end of the bore 568, opposite the first end of the bore 568.

The bore 568 defined in the valve housing 564 may have a first circumferentially extending groove 568a formed in the surface defining the bore near first end of the bore 568 closed by the mounting structure 566. The groove 568a is in fluid communication with the fifth fluid passageway 566e, which, as describe above with respect to FIG. 18, is a fluid passageway, which is connected by the valve arrangement 517 to whichever of the first connector P1 and the second connector P2 is at the lower pressure. Thus, the groove 568a will always be at a low pressure.

A second circumferentially extending groove 568b may be formed in the surface defining the bore 568 axially between the first bore 568a and a third groove 568c formed in the surface defining the bore 568. The groove 568b is in fluid communication with the fourth fluid passageway 566d, which, as describe above with respect to FIG. 18, is a fluid passageway, which is connected by the valve arrangement 517 to whichever of the first connector P1 and the second connector P2 is at the higher pressure. Thus, the groove 568b will always be at a high pressure.

The third groove 568c is formed in the surface defining the bore 568 at an axial location between the second groove 568b and the second end of the bore 568. The third groove 568c communicates, via a relatively large diameter, radially extending bore 540, with the second connector P2. Note that in the embodiment illustrated in FIG. 19A through FIG. 22D, the third groove 568c and the bore 540 cooperate to define the second fluid passageway 566b described above with respect to FIG. 18. This is because the check valves 517b and 517d are disposed in the valve housing 564 in fluid communication with the third groove 568c, as best understood by reference to FIG. 19A, FIG. 20B, and FIG. 21C (making careful note of the location of the line B-B in FIG. 20, and the line C-C in FIG. 21). As seen in FIG. 19A, a bore 571 (also seen in FIG. 20B) is formed perpendicular to and communicating with the bore 540. A bore 572 (also seen in FIG. 21C) is formed parallel to the bore 571 on the opposite side of the annular groove 568c. Both the bore 571 and the bore 572 are in fluid communication with the groove 568c, and thus both the bore 571 and the bore 572 are in fluid communication with the second connector P2 via the bore 540. Respective ends (adjacent the rear surface 510e of the flow control assembly 510) of the bore 571 and the bore 572 are suitably closed by a ball 565. As best seen in FIG. 20B, the check valve 517d is disposed in the bore 571 and is in fluid communication with the fifth passageway 566e so as to convey fluid from the fifth passageway 566e to the bore 540 and thence to the second connector P2 if the pressure in the second connector P2 is less than the pressure in the fifth passageway 566e. As best seen in FIG. 21C, the check valve 517b is disposed in the bore 572 and is in fluid communication with the fourth passageway 566d so as to convey fluid to the fourth passageway 566d and thence to the pilot valve inlet 514b and the groove 568c from the second connector P2 if the pressure in the second connector P2 is greater than the pressure in the fourth passageway 566d.

A fourth groove 568d is formed in the surface defining the bore 568, at an axial location between the third groove 568c and the second end of the bore 568. The groove 568d communicates via a relatively large diameter, radially extending bore 542 with the first connector P1.

Note that in the embodiment illustrated in FIG. 19A through FIG. 22D, the fourth groove 568d and the bore 542 cooperate to define the second fluid passageway 566a described above with respect to FIG. 18. This is because the check valves 517a and 517c are disposed in the valve housing 564 in fluid communication with the fourth groove 568d, as best understood by reference to FIG. 19A, FIG. 20B, and FIG. 21C (making careful note of the location of the line B-B in FIG. 20, and the line C-C in FIG. 21). As seen in FIG. 19A, a bore 573 (also seen in FIG. 21C) is formed perpendicular to and communicating with the bore 542. A bore 574 (also seen in FIG. 21C) is formed parallel to the bore 573 on the opposite side of the annular groove 568d. Both the bore 573 and the bore 574 are in fluid communication with the groove 568d, and thus both the bore 573 and the bore 574 are in fluid communication with the first connecter P1 via the bore 542. Respective ends (adjacent the rear surface 510e of the flow control assembly 510) of the bore 573 and the bore 574 are suitably closed by a ball 565. As best seen in FIG. 21C, the check valve 517a is disposed in the bore 573 and is in fluid communication with the fourth passageway 566d so as to convey fluid to the fourth passageway 566d from the bore 542 and the second connector P2 if the pressure in the second connector P2 is greater than the pressure in the fourth passageway 566d. As best seen in FIG. 20B, the check valve 517c is disposed in the bore 574 and is in fluid communication with the fifth passageway 566e so as to convey fluid from the fifth passageway 566e to the bore 540 and thence to the second connector P2 if the pressure in the second connector P2 is less than the pressure in the fifth passageway 566e.

As best shown in FIG. 19A and FIG. 22D, the pilot operated main spool valve 512 includes a spool 513. The spool 513 has a first end 513a and a second end 513b. The spool 513 is disposed in the bore 568 with the first end 513a in fluid communication with the command chamber 530. In fact, the spool 513, the valve housing 564, and the mounting structure 566 may cooperate to define the variable-volume command chamber 530 between the first end 513a of the spool 513 and the mounting structure 566. The valve housing 564, the spool 513, and the plug 569 may cooperate to define a variable volume feedback chamber 522 between the second axial end 513b of the spool 513 and the plug 569.

The spool 513 may have a second axial end face on the second end 513b which is in fluid communication with the feedback chamber 532. The second axial end face may have an opening 556 defined therein. The spool 513 has a feedback bore 519 extending longitudinally inwardly from the opening 556 in the end face of the second axial end 513b. The feedback bore 519 may extend from the opening 556 into a central portion 550 of the spool 513. The feedback bore 519 in the spool 513 communicates with the feedback chamber 522 to provide fluid communication of the feedback pressure in the feedback bore 519 to the axial end face of the second end 513b of the spool 513.

The spool 513 may have an exterior surface 562. The spool 513 may have a circumferential spool groove 567 formed in the exterior surface 562 at a first axial adjacent the first end 513a of the spool 513. The spool 513 may further have an aperture 567a providing fluid communication between the circumferential spool groove 567 and the feedback bore 519 formed in the spool 513. The aperture 567a allows fluid at feedback pressure existing in the feedback bore 519 during equilibrium conditions to be distributed about the spool 513 in the spool groove 567, which, as will become clearer during the discussion of operation below, minimizes the differential pressure between the command chamber 530 and the spool groove 567, and thus minimizes leakage out of the command chamber 530 between the surface defining the bore 568 in the valve housing 564 and the exterior surface 562 of the spool 513.

One or more ports 563a may provide fluid communication between the exterior surface 562 and the feedback bore 519 at a second axial location on the spool 513, between the first axial location (i.e., the location of the circumferential spool groove 567) and the second end 513b of the spool 513. The ports 563a are normally closed ports, in that when the spool 513 is in the normally closed position thereof (shown in FIG. 19A), the ports 563a do not overlap any of the grooves 568a or 568b formed in the surface of the bore 568 to provide fluid communication between the feedback bore 519 and either the first connector P1 or the second connector P2.

At a third axial location, between the second axial location (i.e., the location of the ports 563a) and the first axial location (i.e., the location of the groove 567), one or more ports 563b may be provided to provide communication between the exterior surface 562 of the spool 513 and the feedback bore 519 within the spool 513. The ports 563b are normally open ports, in that when the spool 513 is in the normally closed position thereof, illustrated in FIG. 19A, the ports 563b communicates with the first groove 568a, and thus with the first connector P2.

A circumferential main flow groove 570 is formed in the surface 562 of the spool 513, at a fourth axial position between the second axial location (the location of the ports 563a) and the second end 513b of the spool 513. The main flow groove 570 is always in fluid communication with the bore 540 communicating with P2. In the embodiment illustrated in FIG. 19A and FIG. 22D, a plurality of preferably equally spaced, longitudinally extending grooves 570a are also formed in the surface 562 of the spool at the fifth axial position. Thus, the main flow groove 570 intersects each longitudinal groove 570a at a perpendicular angle, permitting fluid communication therebetween.

As indicated above, the spool 513 may be disposed within the bore 568 formed in the valve housing 564. A spring 578 may be disposed in the feedback chamber 522, compressed between the plug 569 and the second end 513b of the spool 513. The spring 578 acts to urge the spool 513 to move upwardly (as seen in FIG. 19A and FIG. 22D) toward the fully closed position of the pilot operated main spool valve 512. The spring 578 is preferably chosen with a low spring rate, so that the force exerted by the spring 578 on the spool 513 is generally inconsequential during operation compared to the forces exerted on the spool 513 due to fluid pressures acting on the spool 513. Accordingly, generally we can ignore the operation of the spring 578 in discussion of the operation of the spool.

The spool 513 can be moved axially within the bore 568, so that the longitudinal grooves 570a and the main flow groove 570 cooperate to provide a variable cross-section main valve flow path between the bore 540 (and thus the second connector P2) and the bore 542 and the first connector P1. The cross-section of the main valve flow path varies with the position of the spool 513: The main valve flow path is closed when the spool 513 is in the normally closed position illustrated in FIGS. 19A; the flow path from the main flow groove 570 through the bore 540 and the bore 542 is closed off. As the spool 513 is moved away from the normally closed position thereof, a flow path is established through the main flow groove 570 between the bore 540 and the bore 542, initially via the longitudinal grooves 570a for a small flow cross-section, and then eventually directly with the main flow groove 570 to provide a large flow cross-section.

The spool 513 can be moved in a first direction from the closed position illustrated in FIG. 19A to any of a first range of positions, including a partially open position illustrated in FIG. 22D. Each position in the first range of positions has a different cross-sectional area for fluid communication between the second connector P2 and the second connector P1 through the bore 540, the main flow groove 570 (including the longitudinal grooves 570a), and the bore 542. The bore 542, the bore 540 and the main flow groove 570 (including the longitudinal grooves 570a) thus cooperate to define a main flow valve, controlling the flow of fluid through the flow control assembly 510.

Similarly, as the spool 513 is moved axially within the bore 568, the ports 563a and 563b (communicating through the feedback bore 519 in the spool 513), and the grooves 568a and 568b cooperate to provide a variable cross-section feedback valve flow path between the groove 568a and the groove 568b. The cross-section of the feedback valve flow path varies with the position of the spool 513, just as the main valve flow path does. The feedback valve flow path is closed when the spool 513 is in the normally closed position illustrated in FIGS. 19A because there is no fluid communication between the ports 563a and the groove 568b. There is communication between the groove 568a and the port 563b; because the groove 568a is in fluid communication with the fifth passageway 566e, the groove 568a will always be substantially at a low pressure (the pressure of whichever of the first connector P1 or the second connector P2 has the lower pressure). Thus, since the source of high pressure fluid contained in the groove 568b is isolated from the feedback bore 519 of the spool 513, and the return path to low pressure is available via the groove 568a, the feedback bore 519 will be at low pressure, and so the feedback chamber 532 in communication with the feedback bore 519 will also be at low pressure. Note that the pressure in the command chamber 530 will also be at low pressure since the pilot valve 514 is not supplying a command pressure $P_{cmd}$ to the command chamber 530. With no unbalanced fluid forces acting on the spool 513, the spring 578 will act to urge the spool 513 to remain in the normally closed position, as illustrated in FIG. 19A.

Operation of the flow control assembly 510 will now be described, as if, for example, the flow control assembly 510 is installed into a heat pump type HVAC system so that when operating in the heating mode, system flow will enter the second connector P2, and leave the flow control assembly 510 via the first connector P1. In this situation, the pressure at the second connector P2 will be higher than the pressure at the first connector P1. Therefore, in the valve arrangement 517, the check valve 517b will open to direct fluid from the second connector P2 to the pilot valve inlet 514b, and the check valve 517a will be closed. Before an "open" signal is sent to the pilot valve 514, the upstream variable orifice 514d will be shut, blocking high pressure from the second connector P2 from entering the intermediate portion 514f.

Furthermore, the normally open downstream variable orifice 514e will direct any fluid pressure, which might exist in the intermediate portion 514f out of the pilot valve 514 via the pilot valve outlet 514c, where the check valve 517c will open to send this fluid pressure to the relatively low-pressure first connector P1. When an "open" signal is sent to the pilot valve 514, the pilot valve 514 is moved such that the normally closed upstream variable orifice 514d begins to open, and the normally open downstream variable orifice 514e to begin to close, allowing pressure in the intermediate portion 514f to begin to rise. This increasing pressure in the intermediate portion is sent as an increasing command pressure $P_{cmd}$ via the third passageway 566c to the command chamber 530. This increased command pressure in the command chamber 530 is not matched by pressure in the feedback chamber 532, resulting in a force imbalance that acts to urge the spool 513 downwardly (as viewed in FIG. 19A) toward an open position, such as illustrated in FIG. 22D. As the spool 513 moves downwardly, the main flow path through the spool valve 512 of the flow control assembly 510 begins to open, permitting fluid to flow from the second connector P2, through the bore 540 into the third groove 568c, the main flow groove 570, the fourth groove 568d, the bore 542, and out the first connector P1.

Simultaneously, overlap begins to be established between the groove 568b (which is at high pressure), and the ports 563a. The overlap permits pressurized fluid to flow from the groove 568b through the ports 563a into the feedback bore 519 and be communicated to the feedback chamber 532, raising the pressure in the feedback chamber 532, and lessening the force imbalance acting on the spool 513. Note that some of the fluid supplied into the feedback bore 519 is directed out of the feedback bore through the ports 563b into the low-pressure groove 568a and thence on into the passageway 566e and out the first connector P1.

The feedback pressure developed in the feedback bore 519 is based on the interplay of the fluid flowing into the feedback bore 519 through a first variable cross-sectional flow area (between the ports 563a and the groove 568b) and the fluid flowing out of the feedback bore 519 through a second variable cross-sectional flow area) between the ports 563b and the groove 568a. When the feedback pressure matches the command pressure, travel of the spool 513 will stop, with the main flow path through the main flow groove 570 open an amount that is related to the pressure command $P_{cmd}$. If the pilot valve 514 is subsequently commanded to further open the spool valve 512, the pilot valve will operate to increase pressure command $p_{cmd}$ supplied to the command chamber 530, reinstating a pressure imbalance that will drive the spool toward a more open position until pressure in the feedback chamber is raised (as discussed above) enough to restore balance, with the spool valve 512 now open even further.

Note that as the spool 513 moves downwardly, not only is overlap increased between the ports 563a and the groove 563b that is supplied with high pressure fluid by the valve arrangement 517, but also overlap begins to decrease between the ports 563b and the groove 568a, which tends to limit bleed off from the feedback bore 519, cause pressure in the feedback chamber 532 to rise even more.

To decrease flow through the flow control assembly 510, the signal to the pilot valve 514 is adjusted, the upstream variable orifice 514d will shut somewhat and the downstream variable orifice 514e will open somewhat, causing pressure in the intermediate portion 514f to decrease. This decrease is a decrease to the command pressure $P_{cmd}$ supplied to the spool valve 513. Instantaneously, there is no corresponding decrease in feedback pressure, and the spool 513 will experience a pressure imbalance that moves the spool upward (so that the cross-sectional flow area of the flow path that proceeds through main flow groove 570 decreases; i.e., the spool valve 513 closes some). As the spool valve 513 closes, overlap will decrease between the ports 563a and the groove 563b that is supplied with high-pressure fluid by the valve arrangement 517; also, overlap increases between the ports 563b and the groove 568a, which tends to increase bleed off from the feedback bore 519. These effects will cause pressure in the feedback chamber 532 to fall. The spool valve 513 will achieve a new equilibrium position when feedback pressure drops to match the new command pressure.

Note that if flow in the system in which the flow control assembly 510 is installed is reversed, such as if a heat pump system is changed from the heating mode described above to a cooling mode, operation of the flow control assembly 510 will change very little. When flow reverses, so will the pressures in the first connector P1 and the second connector P2. In the heating mode example above we assumed that the second connector P2 would be the upstream component and thus have the higher pressure, and that the first connector P1 would be the downstream component and have the lower pressure. Now, if flow is reversed, the first connector P1 will be the upstream, higher-pressure component, and the second connector P2 will be the downstream, lower pressure component.

However, the valve arrangement 517 will ensure that the higher pressure is still supplied to the pilot valve inlet 517b and to the groove 568b in the feedback circuit. Similarly, the valve arrangement 517 will continue to ensure that fluid flowing out to the pilot valve 514 is directed to the lower pressure one of the first connector P1 and the second connector P2 (which, in this case, will be the second connector P2). The valve arrangement 517 also continues to connect the groove 568a to the lower pressure one of the first connector P1 and the second connector P2 (which, in this case, will still be the second connector P2). The flow through the pilot valve will continue in the same direction, and control of the opening of the spool valve 512 occurs in the same fashion. The groove 568a will continue to be connected to the lower pressure and the groove 568b will continue to be connected to the higher-pressure one of the first connector P1 and the second connector P2, operation of the spool valve 512. Therefore, it is clear that the operation of the pilot valve 514 and the spool valve 512 will be unaffected by the reversal of flow in the system. The fact that flow through the main flow path (through the main flow groove 570) of the spool valve 512 is in the opposite direction does not cause changes in the way the spool valve 512 is controlled.

When switching between modes of operation of a system, such as a heat pump type refrigeration cycle apparatus, the system normally is shut down as an intermediate step, the compressor and the pilot valve 514 are deenergized, causing the pilot valve 514 to move into the deenergized position shown in FIG. 19.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A valve network, comprising:
a pilot-operated valve having a first connector port and a second connector port, the pilot-operated valve defining a main fluid flow path between the first connector port and the second connector port through which fluid may be directed in a first direction from the first connector port to the second connector port and may be directed in a second direction from the second connector port to the first connector port, such that when the fluid flow through the main fluid flow path in the first direction, pressure in the first connector port will be higher than pressure in the second connector port, and such that when the fluid flow through the main fluid flow path in the second direction, pressure in the second connector port will be higher than pressure in the first connector port, the cross-sectional flow area of the main fluid flow path being controlled in response to a command pressure;
a pilot valve having a pilot inlet and a pilot outlet, the pilot valve developing the command pressure in a fluid conduit connecting the pilot inlet and the pilot outlet; and
a fluid rectifier circuit operable to connect the one of the first connector port and the second connector port which is at a higher pressure to the pilot inlet, and to connect the other of the first connector port and the second connector port to the pilot outlet;
wherein the pilot-operated valve further comprises a fluid pressure feedback circuit having a feedback circuit inlet and a feedback circuit outlet and developing a feedback pressure between the feedback circuit inlet and the feedback circuit outlet, the cross-sectional flow area of the main fluid flow path being controlled by interaction of the feedback pressure and the command pressure, the fluid rectifier circuit being operable to connect the one of the first connector port and the second connector port which is at a higher pressure to both the pilot inlet and to the feedback circuit inlet, and to connect the other of the first connector port and the second connector port to both the pilot outlet and to the feedback circuit outlet.

2. The valve network of claim 1, wherein the pilot inlet is a normally closed orifice and the pilot outlet is a normally open orifice, and wherein the feedback circuit inlet is a normally closed port and the feedback circuit outlet is a normally open port, the spool being movable to control the opening and closing the feedback inlet and feedback outlet to change the feedback pressure.

3. A valve device, comprising:
a pilot valve responsive to a command signal for supplying a fluid at a command pressure to a pilot valve control port, the pilot valve having a pilot valve inlet and a pilot valve outlet; and
a pilot-operated spool valve having:
a body having a first connector and a second connector, each of the first connector and second connector being adapted for fluid communication with an external circuit; and
a spool disposed for sliding movement in the body, the spool having a first end portion and a second end portion opposite the first end portion, the first end portion of the spool being in fluid communication with the pilot valve control port such that the spool is urged to move in a first direction by fluid supplied from the pilot valve at the command pressure, the spool being movable to control a main fluid flow between the first connector and the second connector through the body responsive to the command pressure when the fluid flow is a forward flow from the first connector to the second connector and when the main fluid flow is a reverse flow from the second connector to the first connector; and
a valve arrangement in fluid connection with the pilot valve inlet, the pilot valve outlet, the first connector, and the second connector, the valve arrangement supplying fluid from the one of the first connector and the second connector which is at the higher pressure to the pilot valve inlet, the valve arrangement supplying fluid from the pilot valve outlet to the one of the first connector and the second connector which is at the lower pressure so that flow through the pilot valve is always from the pilot valve inlet to the pilot valve outlet without regard to which one of the first connector and the second connector is at the higher pressure.

4. The valve device of claim 3, the pilot-operated spool valve further comprising:
a fluid pressure feedback circuit having a feedback circuit inlet and a feedback circuit outlet and developing a feedback pressure between the feedback circuit inlet and the feedback circuit outlet as a function of the position of the spool in the body, the spool being positioned as a function of the feedback pressure and the command pressure; and
fluid conduits connecting the fluid pressure feedback circuit in fluid communication with the valve arrangement, such that the valve arrangement also supplies fluid from the one of the first connector and the second connector which is at the higher pressure to the feedback circuit inlet, and such that the valve arrangement also supplies fluid from the one of the first connector and the second connector which is at the lower pressure so that flow through the fluid pressure feedback circuit is always from the feedback circuit inlet to the feedback circuit outlet without regard to which one of the first connector and the second connector is at the higher pressure.

5. The valve device of claim 3, wherein the valve arrangement forms a fluid rectifier circuit.

6. The valve device of claim 5, wherein the valve arrangement comprises a plurality of check valves.

7. The valve device of claim 6, wherein the valve arrangement comprises four check valves, and wherein the pilot valve is operatively connected to the valve arrangement such that a first pair of the four check valves cooperate to pass fluid from the higher pressure of the first connector and the second connector to the pilot valve inlet, and a second pair of the four check valves cooperate to pass fluid from the pilot valve outlet to the lower pressure of the first connector and the second connector.

8. A device, comprising:
 a pilot valve responsive to a command signal for supplying a fluid at a command pressure to a pilot valve control port, the pilot valve having a pilot valve inlet and a pilot valve outlet;
 a pilot-operated spool valve having:
  a housing defining:
   a first connector port adapted to be connected to an external fluid circuit;
   a second connector port adapted to be connected to an external fluid circuit;
   a first feedback port;
   a second feedback port; and
   spool bore in fluid communication with the first connector port, the second connector port, the first feedback port, and the second feedback port; and
  a spool disposed for movement in the spool bore, defining:
   a first axial end face,
   a second axial end face, and
   a feedback bore communicating with the second axial end face and having variable fluid communication with the first feedback port and the second feedback port to develop a feedback pressure which varies in magnitude in dependence on the position of the spool in the spool bore when the first feedback port is supplied with a pressurized fluid;
   the first axial end face of the spool cooperating with the housing to define a command chamber in fluid communication with the pilot valve control port, the second axial end face of the spool cooperating with the housing to define a feedback chamber; and
 a fluid rectifier circuit in fluid communication with the pilot valve and the spool valve to route fluid from the higher pressure of the first connector port and the second connector port to the pilot valve inlet, and to return fluid from the pilot valve outlet to the lower pressure of the first connector port and the second connector port, and to route fluid from the higher pressure of the first connector port and the second connector port to the first feedback port, and to return fluid from the second feedback port to the lower pressure of the first connector port and the second connector port.

9. The device of claim 8, wherein the spool cooperates with the housing to define a variable cross-section main valve flow path between the first connector port and the second connector port.

10. The device of claim 9, wherein the spool defines a groove on an external surface thereof which defines a portion of the main valve flow path between the first connector port and the second connector port, and the main valve flow path does not go through the interior of the spool.

11. The device of claim 9, wherein the spool cooperates with the housing to define a variable cross-section feedback valve flow path between the first feedback port and the second feedback port, the feedback bore being in fluid communication with the feedback valve flow path, the cross-section of the feedback valve flow path varying with the position of the spool to vary pressure in the feedback bore and the feedback chamber in fluid communication with the feedback bore as a function of the position of the spool.

12. The device of claim 11, wherein the pilot valve and the spool valve are normally closed valves.

13. A valve network, comprising:
 a pilot-operated valve having a first connector port and a second connector port, the pilot-operated valve defining a main fluid flow path between the first connector port and the second connector port through which fluid may be directed in a first direction from the first connector port to the second connector port and may be directed in a second direction from the second connector port to the first connector port, such that when the fluid flow through the main fluid flow path in the first direction, pressure in the first connector port will be higher than pressure in the second connector port, and such that when the fluid flow through the main fluid flow path in the second direction, pressure in the second connector port will be higher than pressure in the first connector port, the pilot-operated valve further having a fluid pressure feedback circuit having a feedback inlet and a feedback outlet and developing a feedback pressure between the feedback circuit inlet and the feedback circuit outlet, the cross-sectional flow area of the main fluid flow path being controlled by interaction of the feedback pressure and a command pressure;
 a pilot valve having a pilot inlet and a pilot outlet, the pilot valve developing the command pressure in a fluid conduit connecting the pilot inlet and the pilot outlet; and
 a fluid rectifier circuit operable to connect the one of the first connector port and the second connector port which is at a higher pressure to both the pilot inlet and to the feedback circuit inlet, and to connect the other of the first connector port and the second connector port to both the pilot outlet and to the feedback circuit outlet.

14. A valve network, comprising:
 a pilot-operated valve having a first connector port and a second connector port, the pilot-operated valve defining a main fluid flow path between the first connector port and the second connector port through which fluid may be directed in a first direction from the first connector port to the second connector port and may be directed in a second direction from the second connector port to the first connector port, such that when the fluid flow through the main fluid flow path in the first direction, pressure in the first connector port will be higher than pressure in the second connector port, and such that when the fluid flow through the main fluid flow path in the second direction, pressure in the second connector port will be higher than pressure in the first connector port, the cross-sectional flow area of the main fluid flow path being controlled in response to a command pressure;
 a pilot valve having a pilot inlet and a pilot outlet, the pilot valve developing the command pressure in a fluid conduit connecting the pilot inlet and the pilot outlet; and
 a fluid rectifier circuit operable to connect the one of the first connector port and the second connector port which is at a higher pressure to the pilot inlet, and to connect the other of the first connector port and the second connector port to the pilot outlet;
 wherein the pilot-operated valve is a spool valve comprising:
  a body defining the first connector port and the second connector port; and
  a spool disposed for sliding movement in the body, the spool having a first end portion and a second end portion opposite the first end portion, the first end portion of the spool being in fluid communication with the pilot valve such that the spool is urged to move in a first direction by fluid supplied from the pilot valve at the command pressure, the spool being movable to control the cross-sectional flow area of the main fluid flow path through the body at least partly in response to the command pressure.

15. The valve network of claim 14, wherein the pilot-operated valve further comprises a fluid pressure feedback circuit having a feedback circuit inlet and a feedback circuit outlet and developing a feedback pressure between the feedback circuit inlet and the feedback circuit outlet, the cross-sectional flow area of the main fluid flow path being controlled by interaction of the feedback pressure and the command pressure, the fluid rectifier circuit being operable to connect the one of the first connector port and the second connector port which is at a higher pressure to both the pilot inlet and to the feedback circuit inlet, and to connect the other of the first connector port and the second connector port to both the pilot outlet and to the feedback circuit outlet.

16. The valve network of claim 15, wherein the fluid rectifier circuit comprises a plurality of check valves.

17. The valve network of claim 16, wherein the pilot inlet is a normally closed orifice and the pilot outlet is a normally open orifice.

18. The valve network of claim 16, wherein the fluid rectifier circuit comprises four check valves, and wherein the pilot valve is operatively connected to the fluid rectifier circuit such that a first pair of the four check valves cooperate to pass fluid from the higher pressure of the first connector port and the second connector port to the pilot inlet and to the feedback inlet, and a second pair of the four check valves cooperate to pass fluid from the pilot outlet and the feedback outlet to the lower pressure of the first connector and the second connector.

* * * * *

UNITED STATES PATENT AND TRADEMARK OFFICE
CERTIFICATE OF CORRECTION

PATENT NO. : 9,328,832 B2  
APPLICATION NO. : 14/136985  
DATED : May 3, 2016  
INVENTOR(S) : Edward Nelson Fuller et al.

Page 1 of 1

It is certified that error appears in the above-identified patent and that said Letters Patent is hereby corrected as shown below:

On the Title Page item (73),

Please correct the error of the Assignee from:

"Zhuji" to --Zhuji, Zhejiang--.

Signed and Sealed this  
Twenty-eighth Day of June, 2016

Michelle K. Lee  
*Director of the United States Patent and Trademark Office*